(12) United States Patent
Osako et al.

(10) Patent No.: US 11,543,521 B2
(45) Date of Patent: Jan. 3, 2023

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Keiichi Osako, Tokyo (JP); Kohei Asada, Kanagawa (JP); Tetsunori Itabashi, Kanagawa (JP); Kazuma Yoshii, Tokyo (JP); Kenichi Makino, Kanagawa (JP); Yasunobu Murata, Tokyo (JP); Shigetoshi Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 541 days.

(21) Appl. No.: 16/482,626

(22) PCT Filed: Dec. 7, 2017

(86) PCT No.: PCT/JP2017/044081
§ 371 (c)(1),
(2) Date: Jul. 31, 2019

(87) PCT Pub. No.: WO2018/163545
PCT Pub. Date: Sep. 13, 2018

(65) Prior Publication Data
US 2021/0286073 A1    Sep. 16, 2021

(30) Foreign Application Priority Data

Mar. 9, 2017   (JP) .............................. JP2017-044901

(51) Int. Cl.
*G01S 15/52*   (2006.01)
*G01S 7/52*    (2006.01)
(Continued)

(52) U.S. Cl.
CPC ........ *G01S 15/523* (2013.01); *G01S 7/52026* (2013.01); *G01S 7/539* (2013.01); *G01S 15/582* (2013.01); *G01S 15/588* (2013.01)

(58) Field of Classification Search
None
See application file for complete search history.

(56) References Cited

U.S. PATENT DOCUMENTS

2002/0150262 A1* 10/2002 Carter .................. G08G 1/0962
                                                  381/86
2015/0137998 A1   5/2015 Marti et al.

FOREIGN PATENT DOCUMENTS

JP    04-358936 A    12/1992
JP    2008-149917 A   7/2008
(Continued)

OTHER PUBLICATIONS

International Search Report and Written Opinion of PCT Application No. PCT/JP2017/044081, dated Feb. 20, 2018, 11 pages of ISRWO.

(Continued)

*Primary Examiner* — Thomas S McCormack
(74) *Attorney, Agent, or Firm* — Chip Law Group

(57) ABSTRACT

To provide a mechanism for selectively taking an external sound from an appropriate sound source into an internal space of a moving object. An information processing apparatus including an acquisition unit configured to acquire an audio signal from a sound source existing outside a moving object, a generation unit configured to generate an audio signal from a target sound source at a distance from the moving object, the distance being a distance according to a speed of the moving object, of the sound sources, on the basis of the audio signal acquired by the acquisition unit, and an output control unit configured to output the audio signal (Continued)

generated by the generation unit toward an internal space of the moving object.

19 Claims, 14 Drawing Sheets

(51) Int. Cl.
    *G01S 7/539*     (2006.01)
    *G01S 15/58*     (2006.01)

(56) References Cited

FOREIGN PATENT DOCUMENTS

| | | | | |
|---|---|---|---|---|
| JP | 2009-051333 A | 3/2009 | | |
| JP | 2009-251799 | * 10/2009 | ............... | G08G 1/16 |
| JP | 2009-251799 A | 10/2009 | | |
| JP | 2011-252853 A | 12/2011 | | |
| JP | 2013-256249 A | 12/2013 | | |
| JP | 2015-101332 A | 6/2015 | | |
| JP | 2015-173369 A | 10/2015 | | |
| JP | 2019-504328 A | 2/2019 | | |

OTHER PUBLICATIONS

Office Action for JP Patent Application No. 2019-504328, dated Sep. 28, 2021, 05 pages of English Translation and 05 pages of Office Action.

Office Action for JP Patent Application No. 2019-504328, dated Feb. 8, 2022, 02 pages of English Translation and 02 pages of Office Action.

Office Action for EP Patent Application No. 17899809.2, dated Jul. 22, 2022, 11 pages of Office Action.

Lu, et al., "Motion strategies for binaural localisation of speech sources in azimuth and distance by artificial listeners", Speech Communication, Elsevier, vol. 53, No. 5, XP055648132, May 1, 2011, pp. 622-642.

* cited by examiner

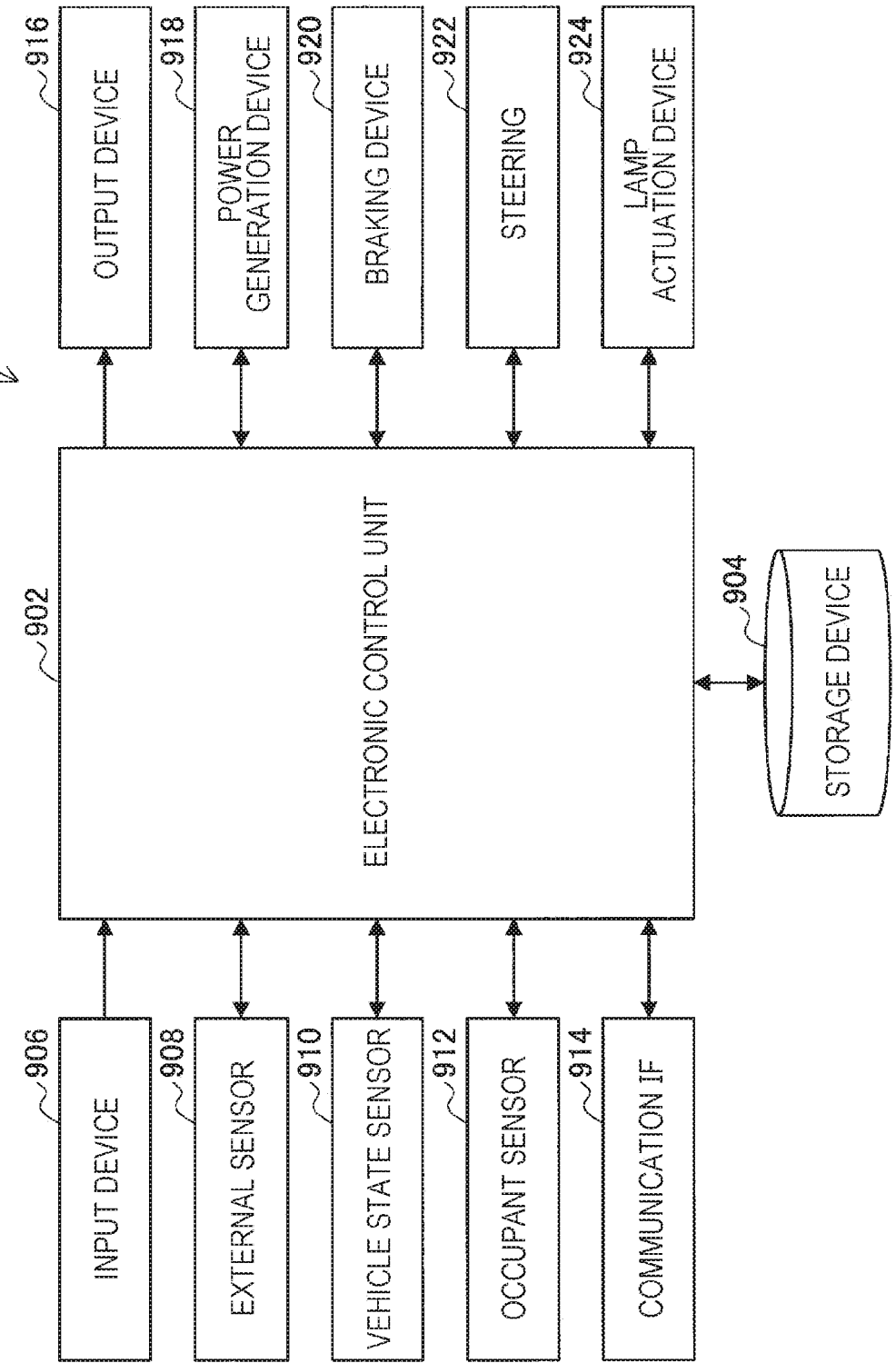

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2017/044081 filed on Dec. 7, 2017, which claims priority benefit of Japanese Patent Application No. JP 2017-044901 filed in the Japan Patent Office on Mar. 9, 2017. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, while technologies for securing low noise such as noise canceling technology have been improved, adverse effects of the improvement of low noise have been pointed out. For example, in a case where a user wears headphones and walks in a city while listening to music, it is difficult to hear an external sound from a sound sources present in surroundings. Therefore, for example, it has been pointed out that the user does not notice approaching of a car, which is dangerous, the user is isolated from the surroundings and gets a cooped-up feeling, and the like.

As a countermeasure against such indication, for example, Patent Document 1 below discloses a technology for reducing the cooped-up feeling felt by the user by taking an external sound in headphones.

CITATION LIST

Patent Document

Patent Document 1: Japanese Patent Application Laid-Open No. 2015-173369

SUMMARY OF THE INVENTION

Problems to be Solved by the Invention

Occurrence of similar circumstances is conceivable in moving objects such as cars. For example, while sound insulation performance of a car body has been dramatically improved in order to reduce an influence of engine noise and running noise of a car on an internal space, adverse effect such as occurrence of danger or a cooped-up feeling due to inability to hear an external sound has occurred.

Therefore, the present disclosure provides a mechanism for selectively taking an external sound from an appropriate sound source into an internal space of a moving object.

Solutions to Problems

According to the present disclosure, provided is an information processing apparatus including an acquisition unit configured to acquire an audio signal from a sound source existing outside a moving object, a generation unit configured to generate an audio signal from a target sound source at a distance from the moving object, the distance being a distance according to a speed of the moving object, of the sound sources, on the basis of the audio signal acquired by the acquisition unit, and an output control unit configured to output the audio signal generated by the generation unit toward an internal space of the moving object.

Furthermore, according to the present disclosure, provided is an information processing method including acquiring an audio signal from a sound source existing outside a moving object, generating an audio signal from a target sound source at a distance from the moving object, the distance being a distance according to a speed of the moving object, of the sound sources, on the basis of the acquired audio signal, and outputting, by an output device, the generated audio signal toward an internal space of the moving object.

Furthermore, according to the present disclosure, provided is a recording medium having a program recorded, the program for causing a computer to function as an acquisition unit configured to acquire an audio signal from a sound source existing outside a moving object, a generation unit configured to generate an audio signal from a target sound source at a distance from the moving object, the distance being a distance according to a speed of the moving object, of the sound sources, on the basis of the audio signal acquired by the acquisition unit, and an output control unit configured to output the audio signal generated by the generation unit toward an internal space of the moving object.

According to the present disclosure, a signal generated on the basis of an audio signal acquired from a sound source present outside a moving object is output toward an internal space of the moving object. Thereby, the external sound can be taken into the internal space of the moving object. Furthermore, an external sound from an appropriate sound source according to a speed of the moving object can be selectively taken in.

Effects of the Invention

As described above, according to the present disclosure, provided is a mechanism for selectively taking an external sound from an appropriate sound source into an internal space of a moving object. Note that the above-described effect is not necessarily restrictive, and any one of effects described in the present specification or any another effect obtainable from the present specification may be exhibited in addition to or in place of the above-described effect.

BRIEF DESCRIPTION OF DRAWINGS

FIG. 14 is a block diagram illustrating an example of a schematic configuration of a vehicle system.

MODE FOR CARRYING OUT THE INVENTION

Favorable embodiments of the present disclosure will be described in detail with reference to the appended drawings. Note that, in the present specification and drawings, redundant description of configuration elements having substantially the same functional configuration is omitted by providing the same sign.

Note that the description will be given in the following order.

1. Overview
2. Functional Configuration
3. Technical Characteristics
3.1. Acquisition of Audio Signal
3.2. Setting of Operation Mode
3.3. Selection of Target Sound Source
3.4. Generation of Audio Signal
3.5. Output of Audio Signal
4. Specific Signal Processing Example
5. Supplement
6. Application
7. Conclusion <<1. Overview>>

Figure 1:
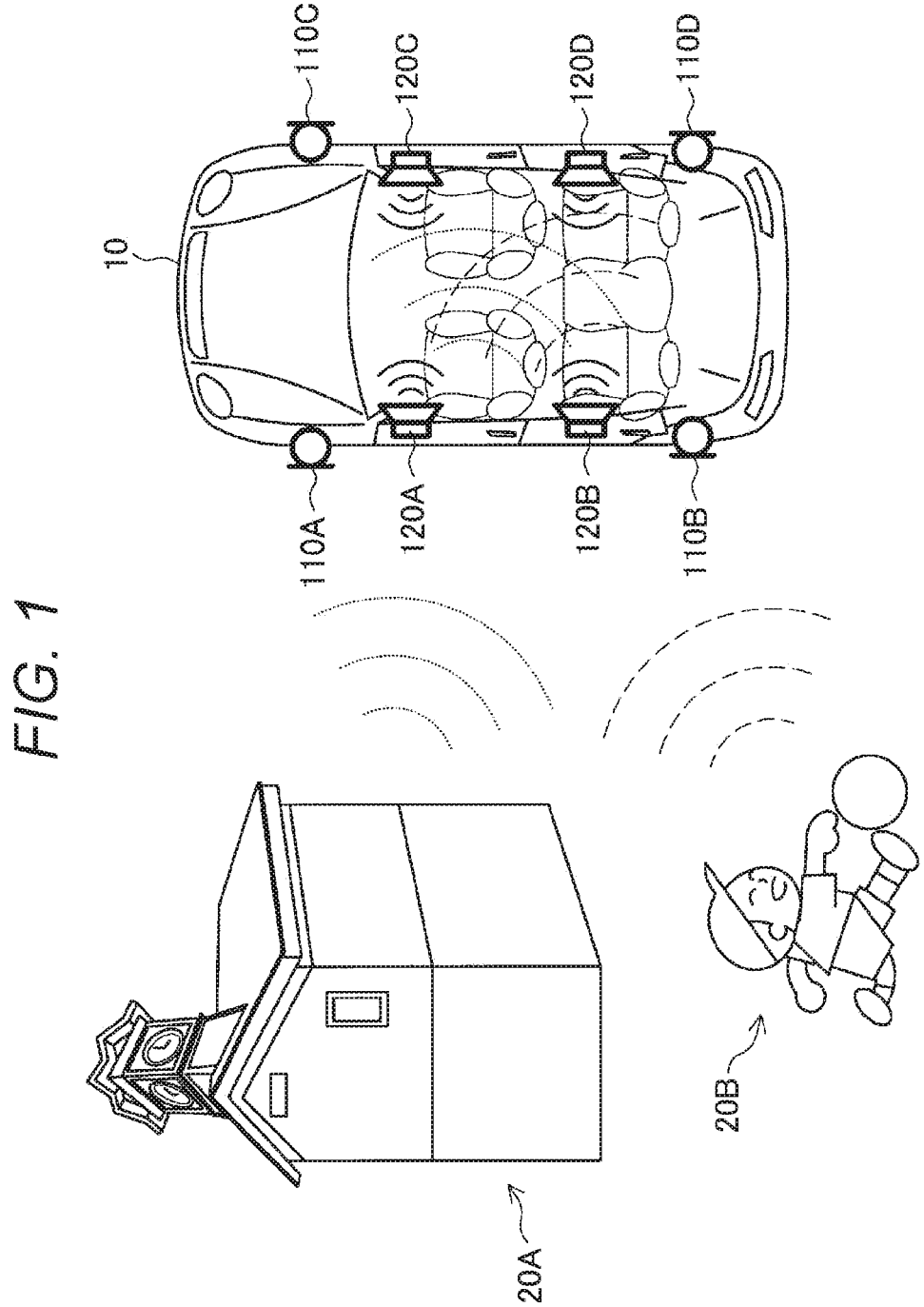
FIG. 1 is a diagram for describing an example of an information processing apparatus according to an embodiment of the present disclosure.

FIG. 1 is a diagram for describing an example of an information processing apparatus according to an embodiment of the present disclosure. As illustrated in FIG. 1, a moving object 10 is traveling around sound sources 20A and 20B.

The moving object 10 has an internal space that is a space for a person to stay in the moving object 10. The moving object 10 illustrated in FIG. 1 is provided with a seat in the internal space, and a driver, a passenger, and the like can stay in the internal space.

In the example illustrated in FIG. 1, the moving object 10 is a car. The moving object 10 may be any moving object having an internal space where a person stays, and may be, for example, a construction vehicle, a ship, an airplane, a train, a vehicle in an amusement park, playground equipment, or the like.

The sound source 20A is a clock tower and sounds a time signal on time. The sound source 20B is a pedestrian and suddenly emits speech, footsteps, and the like. However, the sounds in a space outside the car (hereinafter also referred to as external sounds) are difficult for a person in the car to hear because the internal space of the car 10 is isolated from an external space. Note that, hereinafter, the internal space of the moving object 10 is also referred to as a space inside the car, and the external space is also referred to as a space outside the car.

Therefore, the information processing apparatus according to the present embodiment performs processing of reproducing an external sound toward the space inside the car, in other words, taking the external sound into the space inside the car. For example, the information processing apparatus according to the present embodiment detects an external sound by microphones 110A to 110D, applies predetermined signal processing to an audio signal representing the detected external sound, and outputs the audio signal to the space inside the car by speakers 120A to 120D. With the configuration, with regard to a car, a sound environment that provides a realistic feeling as if there were no car wall can be realized in the space inside the car.

Taking in of the external sound can be performed for driving assistance applications, for example. A driver can get to know a surrounding situation as the external sound is taken into the internal space. For example, the driver listens to the sound of the pedestrian 20B and can prevent an accident by slowing down in preparation for jumping out of the pedestrian 20B to the road.

Taking in of the external sound can also be performed for entertainment applications, for example. For example, in a vehicle covered with glass for securing the weather and safety, such as a dedicated car in a safari park, the sound pressure and characteristics of the external sound change due to the influence of the glass, and the realistic feeling is significantly lost. In such a case, by taking in the external sound, a sound environment as if there were no glass is realized, and a person in the space inside the car can enjoy an experience that provides a realistic feeling.

Note that the information processing apparatus according to the present embodiment is realized as a server apparatus mounted on a moving object or capable of communicating with the moving object, and controls processing of taking in the external sound.

Hereinafter, description will be given on the assumption that the information processing apparatus according to the present embodiment is mounted on the moving object 10.

<<2. Functional Configuration>>

Figure 2:
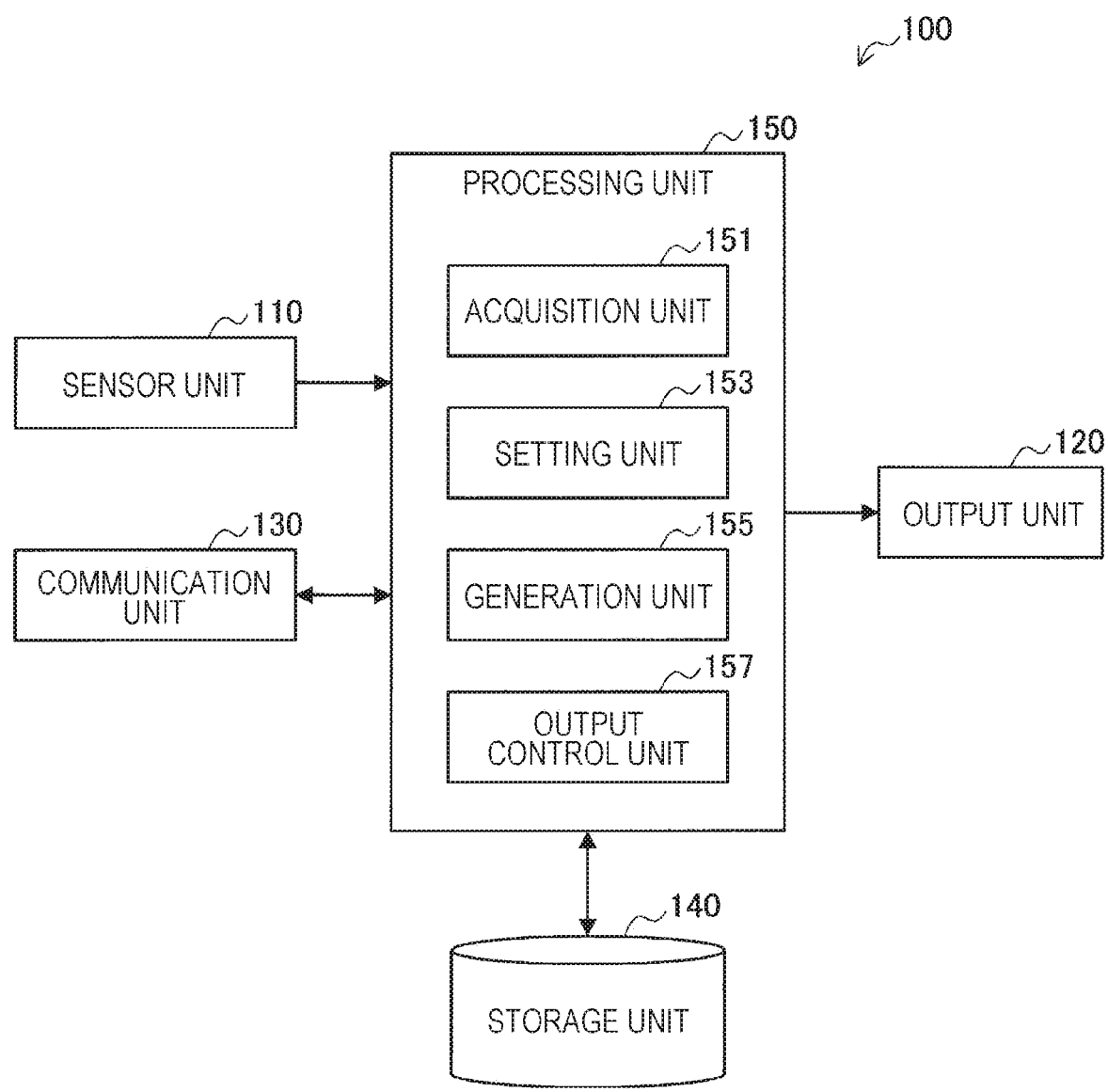
FIG. 2 is a block diagram illustrating an example of a logical configuration of the information processing apparatus according to the present embodiment.

FIG. 2 is a block diagram illustrating an example of a logical configuration of the information processing apparatus according to the present embodiment. As illustrated in FIG. 2, an information processing apparatus 100 according to the present embodiment includes a sensor unit 110, an output unit 120, a communication unit 130, a storage unit 140, and a processing unit 150.

(1) Sensor Unit 110

The sensor unit 110 has a function to detect various types of information. The sensor unit 110 outputs detected sensor information to the processing unit 150.

The sensor unit 110 may include a sensor that detects information of the external space of the moving object. For example, the sensor unit 110 detects the external sound as the information of the external space of the moving object. The sensor that detects the external sound can include a plurality of microphones such as the microphones 110A to 110D illustrated in FIG. 1. Of course, there may be only one microphone. The microphone for detecting the external sound is installed in the moving object in a state where at least a part of the configuration, typically, such as a diaphragm, is exposed to the external space (in other words, in a state of being in contact with outside air). For example, the microphone for detecting the external sound is installed on an outer wall of the car body. In addition, the sensor unit 110 may detect a captured image, depth information, an infrared image, or the like as the information of the external space of the moving object.

The sensor unit 110 can include a sensor that detects information regarding a state of the moving object. For example, the sensor unit 110 detects speed, acceleration, position information, or the like of the moving object as the information regarding a state of the moving object.

The sensor unit 110 can include a sensor that detects information of the internal space of the moving object. For example, the sensor unit 110 detects input information by a person in the internal space, voice, a captured image, biological information, or the like as the information of the internal space of the moving object.

The sensor unit 110 can include a clock that detects time information.

(2) Output Unit 120

The output unit 120 has a function to output various types of information. The output unit 120 outputs information on the basis of control by the processing unit 150.

The output unit 120 can output information to the internal space of the moving object. For example, the output unit 120 can include a plurality of speakers, such as the speakers 120A to 120D illustrated in FIG. 1. Of course, there may be only one speaker. The speaker is typically installed in the space inside the car, such as an inside of a door. In addition, the output unit 120 may output an image (a still image or a moving image), vibration, or the like.

(3) Communication Unit 130

The communication unit 130 has a function to transmit and receive signals to and from other devices. For example, the communication unit 130 can communicate using any communication standard such as cellular communication such as 4G or 5G, a wireless local area network (LAN), Wi-Fi (registered trademark), or Bluetooth (registered trademark). In particular, in a case where the moving object is a car, the communication unit 130 can communicate using vehicle to everything (V2X) communication.

(4) Storage Unit 140

The storage unit 140 has a function to temporarily or permanently store information for the operation of the information processing apparatus 100. For example, the storage unit 140 stores known sound source information to be described below.

(5) Processing Unit 150

The processing unit 150 provides various functions of the information processing apparatus 100. The processing unit 150 includes an acquisition unit 151, a setting unit 153, a generation unit 155, and an output control unit 157. Note that the processing unit 150 can further include other configuration elements in addition to the aforementioned configuration elements. In other words, the processing unit 150 can also perform operations other than the operations of the aforementioned configuration elements. The functions of the configuration elements of the acquisition unit 151, the setting unit 153, the generation unit 155, and the output control unit 157 will be described in detail below.

<<3. Technical Characteristics>>

<3.1. Acquisition of Audio Signal>

First, the information processing apparatus 100 (for example, the acquisition unit 151) acquires an audio signal (in other words, a signal representing an external sound) from a sound source existing outside the moving object. For example, the information processing apparatus 100 acquires an audio signal of a sound that is actually sounding at the sound source existing outside the moving object, which is detected by the microphones 110A to 110D illustrated in FIG. 1.

<3.2. Setting of Operation Mode>

After acquiring the audio signal, the information processing apparatus 100 (for example, the setting unit 153) sets an operation mode.

The information processing apparatus 100 (setting unit 153) selects and sets an operation mode from an operation mode group including a plurality of operation modes. Hereinafter, an example of the operation mode included in the operation mode group will be described.

(1) Operation Mode Group

The operation mode group may include a first operation mode in which an output to the internal space of the moving object is not performed. The information processing apparatus 100 operates in the first operation mode to stop taking the external sound into the space inside the car.

The operation mode group may include a second operation mode in which an output to the internal space of the moving object is performed. The information processing apparatus 100 operates in the second operation mode to perform taking the external sound into the space inside the car. The second operation mode can be subdivided into third to fifth operation modes to be described below.

The second operation mode may include the third operation mode for a known sound source as a target sound source. The information processing apparatus 100 operates in the third operation mode to perform taking the external sound from the known sound source into the space inside the car. The known sound source is a sound source that emits a sound according to a predetermined condition. Examples of the known sound source include sound sources that emit sounds as scheduled according to conditions such as a place and a time, such as the clock tower 20A illustrated in FIG. 1, a fireworks display, and a railroad crossing. In the third operation mode, sounds such as a sound from a clock tower in a tourist attraction or a crossing noise can be taken into the space inside the car. Therefore, it can be said that the third operation mode is effective for driving assistance applications and entertainment applications.

The second operation mode may include the fourth operation mode for an unknown sound source as the target sound source. The information processing apparatus 100 operates in the fourth operation mode to perform taking the external sound from the unknown sound source into the space inside the car. The unknown sound source is a sound source that suddenly emits a sound. As the unknown sound source, for example, the pedestrian 20B illustrated in FIG. 1, an oncoming car, or the like can be considered. In the fourth operation mode, a sound that suddenly occurs, such as a sound of a pedestrian and an oncoming car can be taken into the space inside the car. Therefore, the fourth operation mode is particularly effective for driving assistance applications.

The second operation mode may include the fifth operation mode for the known sound source and the unknown sound source as the target sound sources. The information processing apparatus 100 operates in the fifth operation mode to perform taking the external sounds from both the known sound source and the unknown sound source into the space inside the car.

(2) Setting of Operation Mode

The information processing apparatus 100 (for example, the setting unit 153) can set (in other words, switch) the operation mode on the basis of various criteria.

External Sound

The information processing apparatus 100 may set the operation mode on the basis of the audio signal from the sound source existing outside the moving object. Specifically, the information processing apparatus 100 can switch between the first operation mode and the second operation mode according to the presence, the size, the type, or the like of the external sound.

Known Sound Source Information

The information processing apparatus 100 may set the operation mode on the basis of the known sound source information.

The known sound source information can include map information, for example, and the information processing apparatus 100 may set the operation mode on the basis of the map information indicating the position of the known sound source and position information of the moving object.

Figure 3:
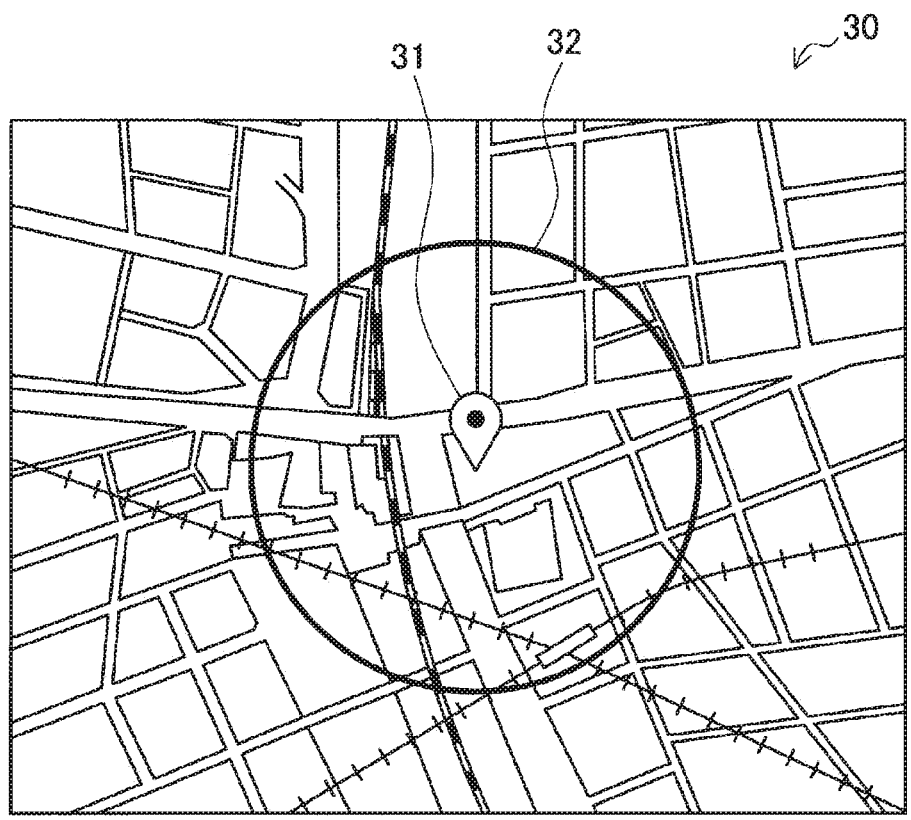
FIG. 3 is a diagram for describing an example of setting of an operation mode according to the present embodiment.

The map information includes information indicating a range in which the sound from the known sound source should be taken in. For example, the range in which the sound from the known sound source should be taken in may be defined as the position of the known sound source and a circle centered on the position. In this case, the information indicating the range in which the sound from the known sound source should be taken in includes position information of the known sound source and distance information of a radius of the circle. An example of operation mode setting based on the map information will be described with reference to FIG. 3. FIG. 3 is a diagram for describing an example of setting of an operation mode according to the present embodiment. FIG. 3 illustrates an example of map information 30, and the map information 30 includes position information indicating a position 31 of the known sound source, and information indicating a range 32 within a predetermined distance from the known sound source. For example, the information processing apparatus 100 sets the third operation mode in a case where the moving object is located within the range 32 and sets the fourth operation mode in a case where the moving object is located outside the range 32 with reference to the map information 30.

The map information may further include information indicating the time zone in which the known sound source emits the sound. In this case, the information processing apparatus 100 sets the operation mode on the further basis of the current time. For example, in a case where the moving object is located within the range in which the sound from the known sound source should be taken in and the current time is included in a time zone in which the known sound source emits the sound, the information processing apparatus 100 sets the third operation mode. Thereby, the information processing apparatus 100 can take the sound from the known sound source into the space inside the car in a pinpoint manner in time with the time zone in which the known sound source emits the sound.

Furthermore, the map information may include information indicating types of roads such as general roads, expressways, elevated roads, and underground roads, and the information processing apparatus 100 may set the operation mode on the basis of such information.

The known sound source information may include an additional sound. The additional sound is an audio signal associated with the known sound source and is stored in advance in the storage unit 140, or an external server apparatus or the like. The information processing apparatus 100 acquires, in the third mode or the fifth mode, the previously stored additional sound related to the known sound source and outputs the additional sound. The additional sound is, for example, description regarding the known sound source such as a history of the clock tower 20A in the example illustrated in FIG. 1, a sound effect in an amusement park, or the like. For example, in the example illustrated in FIG. 1, in a case where the car 10 is located within a predetermined distance from the clock tower 20A in the time zone in which the clock tower 20A emits the sound, the information processing apparatus 100 outputs the sound describing the history of the clock tower 20A while taking the sound actually emitted from the clock tower 20A into the space inside the car. In this way, the aspect of entertainment in the entertainment applications can be enhanced by the additional sound.

Note that a storage location of the known sound source information is arbitrary. For example, the known sound source information may be stored in the information processing apparatus 100 or may be stored in a server apparatus on the Internet. Furthermore, the map information may be stored in the information processing apparatus 100 and the additional sound may be stored in the server apparatus, among the known sound source information, and may be downloaded as needed.

Information from External Device

The information processing apparatus 100 may set the operation mode on the basis of the information from an external device.

For example, the external device may be a car, a device carried by a pedestrian, or a device capable of vehicle to everything (V2X) communication such as a road side unit (RSU). For example, the information processing apparatus 100 recognizes the presence of a car traveling in a driver's blind area on the basis of information from the RSU, sets the fourth operation mode, and takes the sound from the car into the space inside the car, thereby preventing an accident in advance.

User Operation

The information processing apparatus 100 may set the operation mode on the basis of a user operation. For example, the information processing apparatus 100 may set the operation mode according to a selection operation of the operation mode by the user.

<3.3. Selection of Target Sound Source>

After setting of the operation mode, the information processing apparatus 100 (for example, the generation unit 155) selects a sound source that will be a target from which a sound will be taken into the space inside the car, as a target sound source, from sound sources (the unknown sound source and/or the known sound source) existing around the moving object according to the set operation mode. Of course, all of the sound sources may be selected as the target sound sources. Note that, in the third mode or the fifth mode, there may be cases where the known sound source is not selected as the target sound source or the known sound source is always selected as the target sound source.

Selection criteria of the target sound source can be variously considered. Examples will be described below. The information processing apparatus 100 may use one or a plurality of the determination criteria described below in combination.

Distance

The information processing apparatus 100 may select a sound source at a distance from the moving object, the distance being according to the speed of the moving object, from among the sound sources, as the target sound source.

Specifically, the information processing apparatus 100 selects the sound source farther from the moving object as the speed of the moving object is higher as the target sound source, and selects the sound source closer to the moving object as the speed of the moving object is lower as the target sound source. Typically, in a case where a car speed is high, the moving object is immediately away from a nearby sound source, so it is conceivable that a sound from a distant sound source is more useful. Meanwhile, in a case where the car speed is low, it takes time to approach a distant sound source, so it is conceivable that a sound from a nearby sound source is more useful. The information processing apparatus 100 can take a more useful sound into the space inside the car by setting the sound source at a distance according to the speed of the moving object as the target sound source.

Determination criteria of the distance between the moving object and the sound source can be variously considered. Hereinafter, examples will be described with reference to FIGS. 4 and 5. Note that the information processing apparatus 100 may use one or a plurality of the determination criteria described below in combination.

Figure 4:
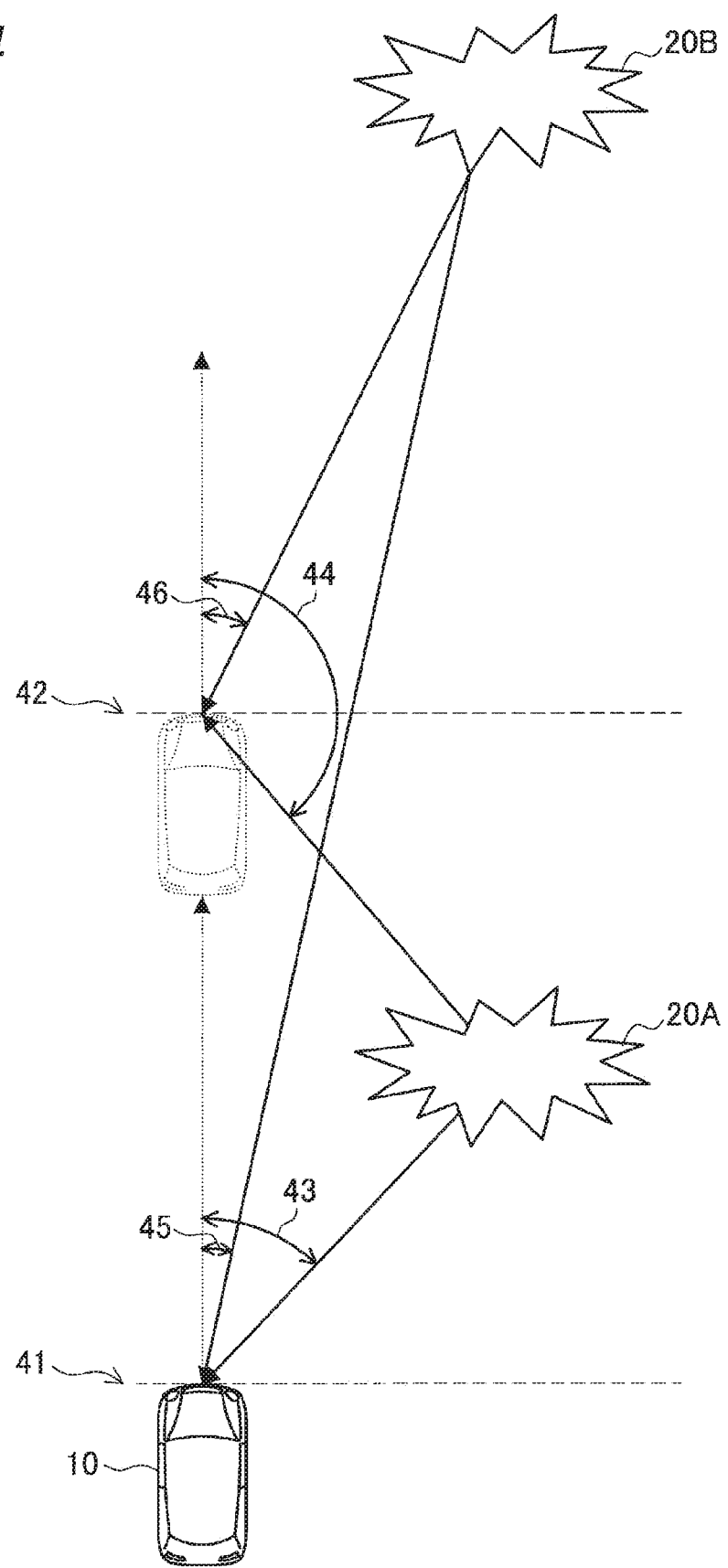
FIG. 4 is a diagram for describing an example of processing of determining a distance between a moving object and a sound source according to the present embodiment.
Figure 5:
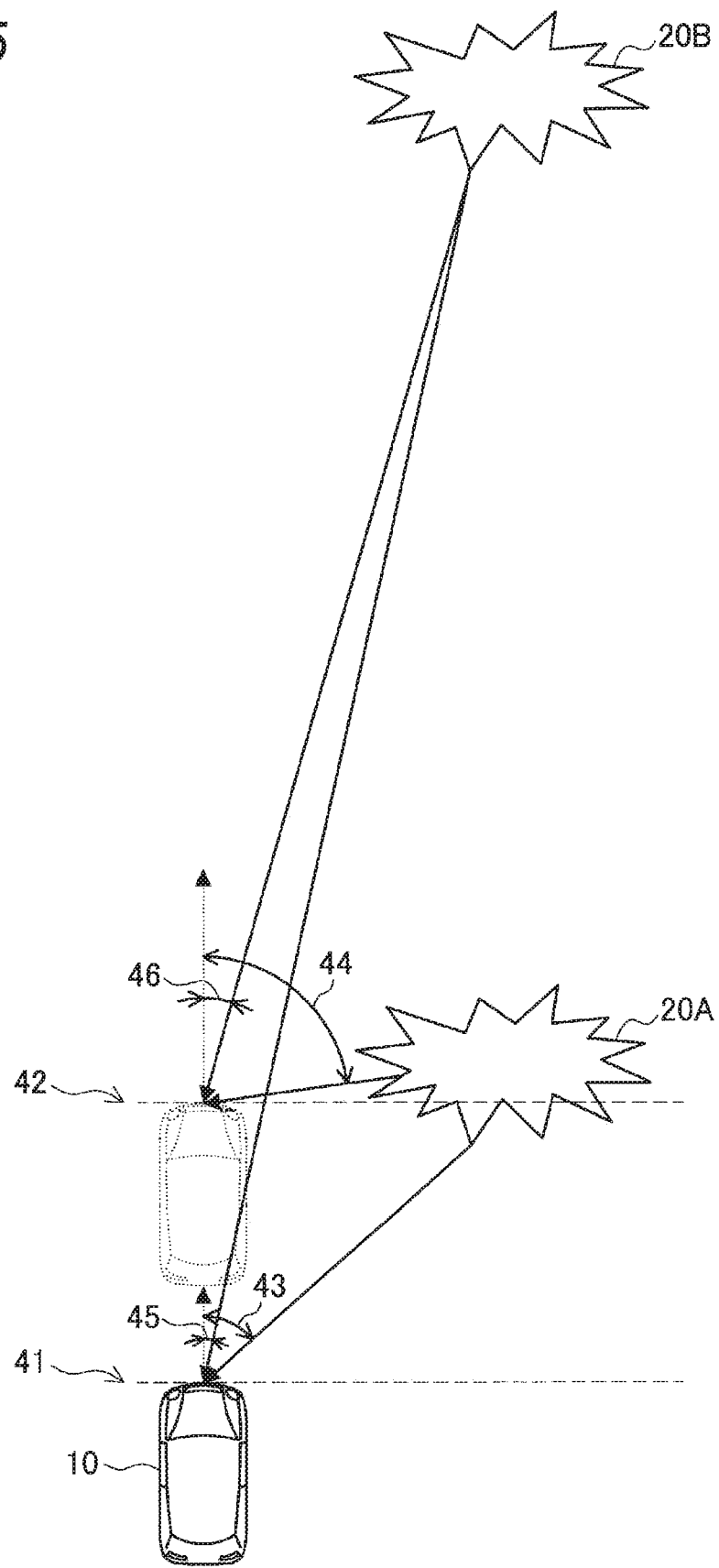
FIG. 5 is a diagram for describing an example of the processing of determining a distance between a moving object and a sound source according to the present embodiment.

FIGS. 4 and 5 are diagrams for describing examples of processing of determining the distance between the moving object and the sound source according to the present embodiment. FIGS. 4 and 5 illustrate a position 41 at a certain time (hereinafter also referred to as a reference time) of the moving object 10, a position 42 after t seconds from the reference time, and the sound source 20A close to the moving object 10 and the sound source 20B distant from the moving object 10 at the reference time. Then, FIG. 4 is an example of a case where the speed of the moving object 10 is high, and FIG. 5 is an example of a case where the speed of the moving object 10 is low.

For example, the information processing apparatus 100 may determine the distance between the moving object and the sound source on the basis of time-series change in an azimuth of the sound source with reference to the moving object. Referring to FIG. 4, in a case where the speed of the moving object 10 is high, the time-series change (from an angle 43 to an angle 44) during t seconds in the azimuth of the sound source 20A with reference to the moving object 10 is large. Furthermore, referring to FIG. 4, in the case where the speed of the moving object 10 is high, the time-series change (from an angle 45 to an angle 46) during t seconds in an azimuth of the sound source 20B with reference to the moving object 10 is small. Therefore, in the case where the speed of the moving object 10 is high, the information processing apparatus 100 can determine that the distance to the sound source having large time-series change in the azimuth with reference to the moving object is small, and can determine that the distance to the sound source having small time-series change is large. Note that determination of identity of the sound source at the reference time and the time after t seconds may be performed on the basis of spectral shapes of the sounds, for example.

For example, the information processing apparatus 100 may determine the distance between the moving object and the sound source on the basis of time-series change in sound pressure from the sound source. Referring to FIG. 4, in the case where the speed of the moving object 10 is high, the time-series change during t seconds in the sound pressure from the sound source 20A is large because the distance between the moving object 10 and the sound source 20A largely changes. Furthermore, referring to FIG. 4, in the case where the speed of the moving object 10 is high, the time-series change during t seconds in the sound pressure from the sound source 20B is small because the distance between the moving object 10 and the sound source 20B does not much change. Therefore, in the case where the speed of the moving object 10 is high, the information processing apparatus 100 can determine that the distance to the sound source having large time-series change in the sound pressure is small, and can determine that the distance to the sound source having small time-series change is large.

Here, referring to FIG. 5, in a case where the speed of the moving object 10 is low, it can be considered that there is a small difference in the time-series change in the azimuth of the sound source and in the time-series change in the sound pressure between the sound source at the large distance and the sound source at the small distance to the moving object. Specifically, in the case where the speed of the moving object 10 is low, the time-series change (from the angle 43 to the angle 44) during t seconds in the azimuth of the sound source 20A with reference to the moving object 10 is small, and the time-series change (from the angle 45 to the angle 46) during t seconds in the azimuth of the sound source 20B is also small. Furthermore, in the case where the speed of the moving object 10 is low, the time-series change during t seconds in the sound pressure from the sound source 20A is small because the distance between the moving object 10 and the sound source 20A does not much change, and the time-series change during t seconds in the sound pressure from the sound source 20B is also small because the distance between the moving object 10 and the sound source 20B does not much change.

Therefore, the information processing apparatus 100 may determine the distance between the moving object and the sound source on the basis of an absolute value of the sound pressure from the sound source. For example, it can be considered that the absolute value of the sound pressure is larger as the distance between the moving object and the sound source is smaller, and the absolute value of the sound pressure is smaller as the distance is smaller. Therefore, the information processing apparatus 100 can determine the distance between the moving object and the sound source by referring to the absolute value of the sound pressure in the case where the speed of the moving object is low. Of course, the information processing apparatus 100 can increase determination accuracy by referring to the absolute value of the sound pressure even in the case where the speed of the moving object is high.

Note that, in the above-description, it has been described that the information processing apparatus 100 selects a sound source at a distance from the moving object, the distance being according to the speed of the moving object, from among the sound sources, as the target sound source. However, the speed of the moving object here may be a relative speed to the sound source. For example, in a case where the relative speed is small because the moving object and the sound source travel in parallel, the information processing apparatus 100 can determine the distance to the moving object by the determination criterion of the case where the speed of the moving object is low. Furthermore, in a case where the relative speed is large because the moving object and the sound source travel opposite to each other, for example, the information processing apparatus 100 can determine the distance to the moving object by the determination criterion of the case where the speed of the moving object is high.

Type

The information processing apparatus 100 may select whether or not to set the sound source as the target sound source according to the type of the sound source. For example, the information processing apparatus 100 selectively takes human voice into the space inside the car and does not take music that sounds outside the car into the space inside the car. With such switching, the information processing apparatus 100 can selectively take only the sound to be taken into the space inside the car.

Target

The information processing apparatus 100 may select whether or not to set the sound source as the target sound source according to whether or not the target of the sound from the sound source is the moving object. For example, the information processing apparatus 100 selectively takes a horn honking at the moving object into the space inside the car, and does not take the horn honking at another car into the space inside the car. Such switching cab be performed on the basis of, for example, the direction of the car that has honked the horn or the like. With such switching, the information processing apparatus 100 can selectively take only the sound to be taken into the space inside the car.

<3.4. Generation of Audio Signal>

After selection of the target sound source, the information processing apparatus 100 (for example, the generation unit 155) generates the audio signal from the target sound source on the basis of the acquired audio signal.

Generation of the audio signal from the target sound source can be performed by applying so-called beamforming processing to the acquired audio signal. For example, the information processing apparatus 100 may apply signal processing of canceling sounds other than the sound from the target sound source to the acquired audio signal. Furthermore, the information processing apparatus 100 may apply sound processing of emphasizing the sound from the target sound source to the acquired audio signal.

Note that, as described above, in the third or the fifth operation mode, the information processing apparatus 100 may use the additional sound in place of or in addition to the generation by the signal processing, as the audio signal from the target sound source <3.5. Output of Audio Signal>

After generation of the audio signal from the target sound source, the information processing apparatus 100 (for example, the output control unit 157) causes the generated audio signal to be output toward the internal space of the moving object. For example, the information processing apparatus 100 outputs the generated audio signal by the speakers 120A to 120D illustrated in FIG. 1.

<<4. Specific Signal Processing Example>>

Hereinafter, an example of specific signal processing will be described with reference to FIGS. 6 to 12.

(1) First Example

Figure 6:
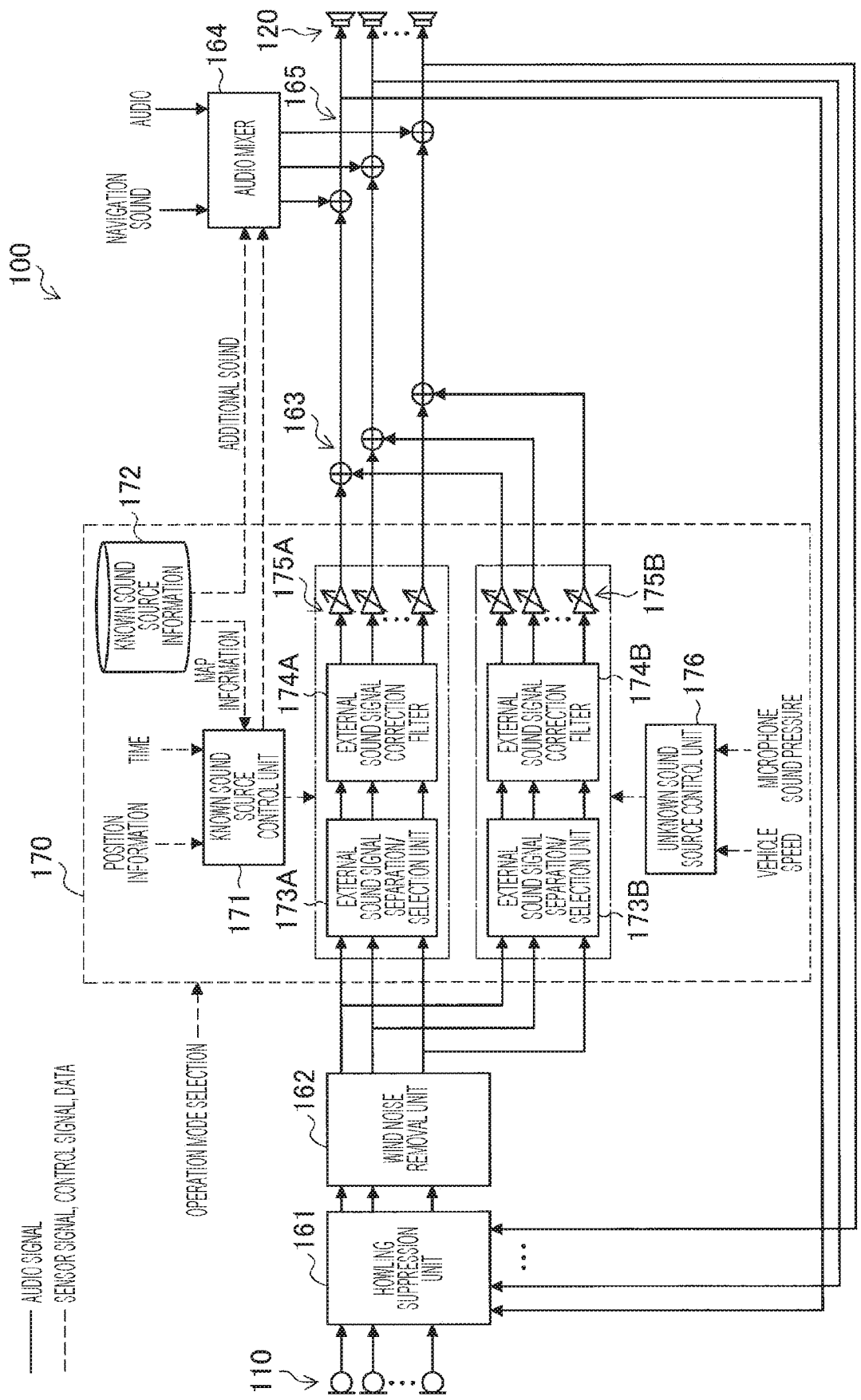
FIG. 6 is a diagram for describing an example of signal processing by the information processing apparatus according to the present embodiment.

FIG. 6 is a diagram for describing an example of signal processing by the information processing apparatus 100 according to the present embodiment. As illustrated in FIG. 6, the information processing apparatus 100 inputs, to a howling suppression unit 161, a plurality of audio signals detected by the plurality of microphones (for example, microphone array) included in the sensor unit 110.

Howling Suppression Unit 161

The howling suppression unit 161 performs processing of suppressing howling. Howling is a phenomenon of oscillation due to formation of a feedback loop in which a signal emitted from a speaker is input again to a microphone. The howling suppression processing will be described with reference to FIG. 7.

Figure 7:
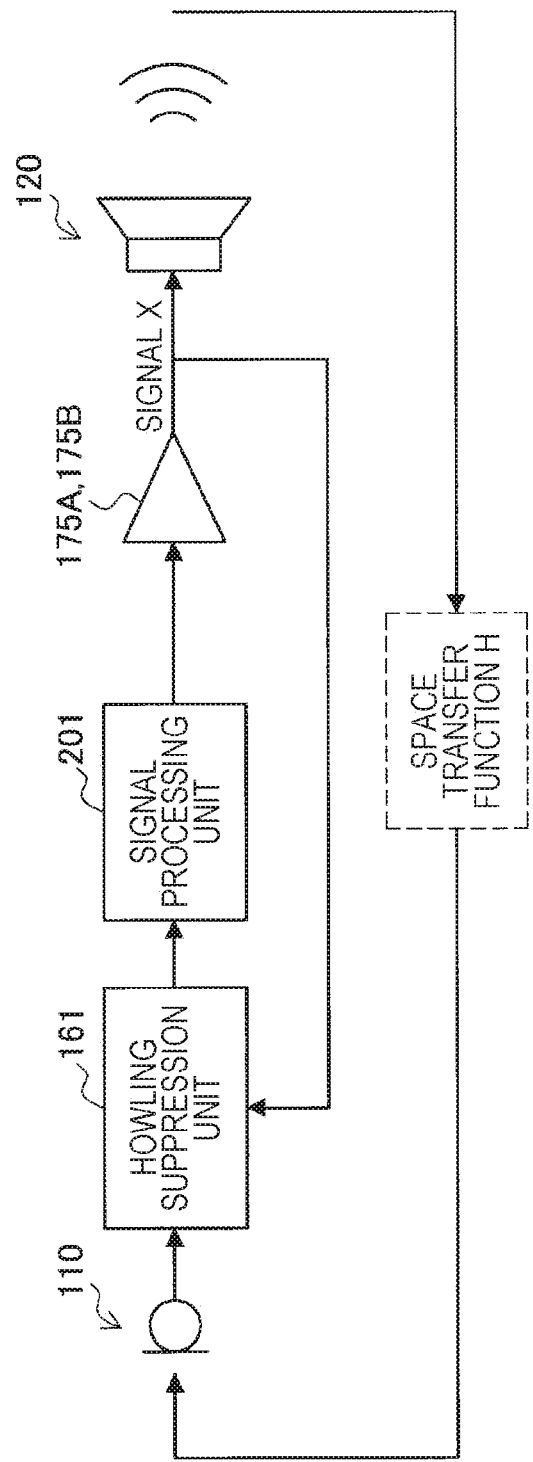
FIG. 7 is a diagram for describing an example of howling suppression processing according to the present embodiment.

FIG. 7 is a diagram for describing an example of the howling suppression processing according to the present embodiment. As illustrated in FIG. 7, the howling suppression processing by the howling suppression unit 161 is applied to the audio signal input from the microphone 110, signal processing by a signal processing unit 201 is applied to the audio signal, the audio signal is amplified by an amplifier 175A or 175B, and the audio signal is output from the speaker 120. Note that, in FIG. 7, other signal processing illustrated in FIG. 6 is simplified or omitted, and the signal processing unit 201 includes a wind noise removal unit 162 illustrated in FIG. 6 and the like. The howling suppression unit 161 measures a space transfer function H in advance. Then, the howling suppression unit 161 monitors a signal X reproduced from the speaker 120, and estimates a signal Y that is the signal X passing through the space transfer function H and entering the microphone 110 again. The howling suppression unit 161 analyzes a frequency characteristic of the signal Y, and suppresses a signal in a band exceeding a specified value in a case where a gain of the signal Y to be fed back exceeds a specified value, thereby suppressing howling. For example, the howling suppression unit 161 applies a notch filter to suppress the signal in the band exceeding the specified value. Note that, in a case where suppression of the howling by the notch filter is difficult, the howling suppression unit 161 stops the reproduction or lowers the gain to suppress the howling.

Wind Noise Removal Unit 162

As illustrated in FIG. 6, the information processing apparatus 100 inputs the signal after application of the howling suppression processing to the wind noise removal unit 162. The wind noise removal unit 162 performs processing of removing wind noise.

Wind pressure removal may be performed by a fixed filter. The wind noise has a characteristic that energy is concentrated in a low frequency band. Therefore, the wind noise removal unit 162 applies a high pass filter, which decrease 200 to 300 Hz or less, to the signal, thereby removing the wind noise.

The wind noise removal may be performed by signal processing. Because the wind noise is caused by air turbulence generated near the microphone rather than a sound wave, different noise is input to each microphone. In other words, correlation between the microphones is characterized by low in the wind noise and high in normal sound waves. Therefore, the wind noise removal unit 162 can dynamically remove the wind noise by performing processing of calculating the correlation between microphones for each frequency band, determining that the wind noise exists when a correlation value falls below a certain threshold value, and lowering the gain in the time and the band in which the wind noise exists.

Processing Group 170

As illustrated in FIG. 6, the information processing apparatus 100 performs each processing included in a processing group 170 after applying the wind noise removal processing. The processing in the processing group 170 differs depending on the set operation mode. The processing group 170 illustrated in FIG. 6 includes the processing executed in the fifth operation mode.

Known Sound Source Control Unit

A known sound source control unit 171 controls signal processing related to the known sound source. Specifically, the known sound source control unit 171 controls an external sound signal separation/selection unit 173A, an external sound signal correction filter 174A, and the amplifier 175A on the basis of the position information, the time, and the map information of known sound source information 172. Note that the signal input to the processing group 170 passes through the external sound signal separation/selection unit 173A, the external sound signal correction filter 174A, and the amplifier 175A in order. Note that the known sound source control unit 171 may realize the operation in the first operation mode or the fourth operation mode by setting an amplification amount by the amplifier 175A to 0 (in other words, setting amplitude to 0) to stop reproduction of the signal related to the known sound source.

Unknown Sound Source Control Unit

An unknown sound source control unit 176 controls signal processing regarding the unknown sound source. Specifically, the unknown sound source control unit 176 controls an external sound signal separation/selection unit 173B, an external sound signal correction filter 174B, and the amplifier 175B on the basis of the car speed (in other words, the speed of the moving object) and microphone sound pressure. Note that the signal input to the processing group 170 passes through the external sound signal separation/selection unit 173B, the external sound signal correction filter 174B, and the amplifier 175B in order. Note that the unknown sound source control unit 176 may realize the operation in the first operation mode or the third operation mode by setting an amplification amount by the amplifier 175B to 0 (in other words, setting amplitude to 0) to stop reproduction of the signal related to the unknown sound source.

External Sound Signal Separation/Selection Unit

The external sound signal separation/selection unit 173 (173A or 173B) performs separation and/or selection of an external sound signal (the audio signal of the external sound). The external sound signal separation/selection unit 173 can adopt conventionally known beamforming technology or sound source separation technology. Hereinafter, an example will be described with reference to FIG. 8.

Figure 8:
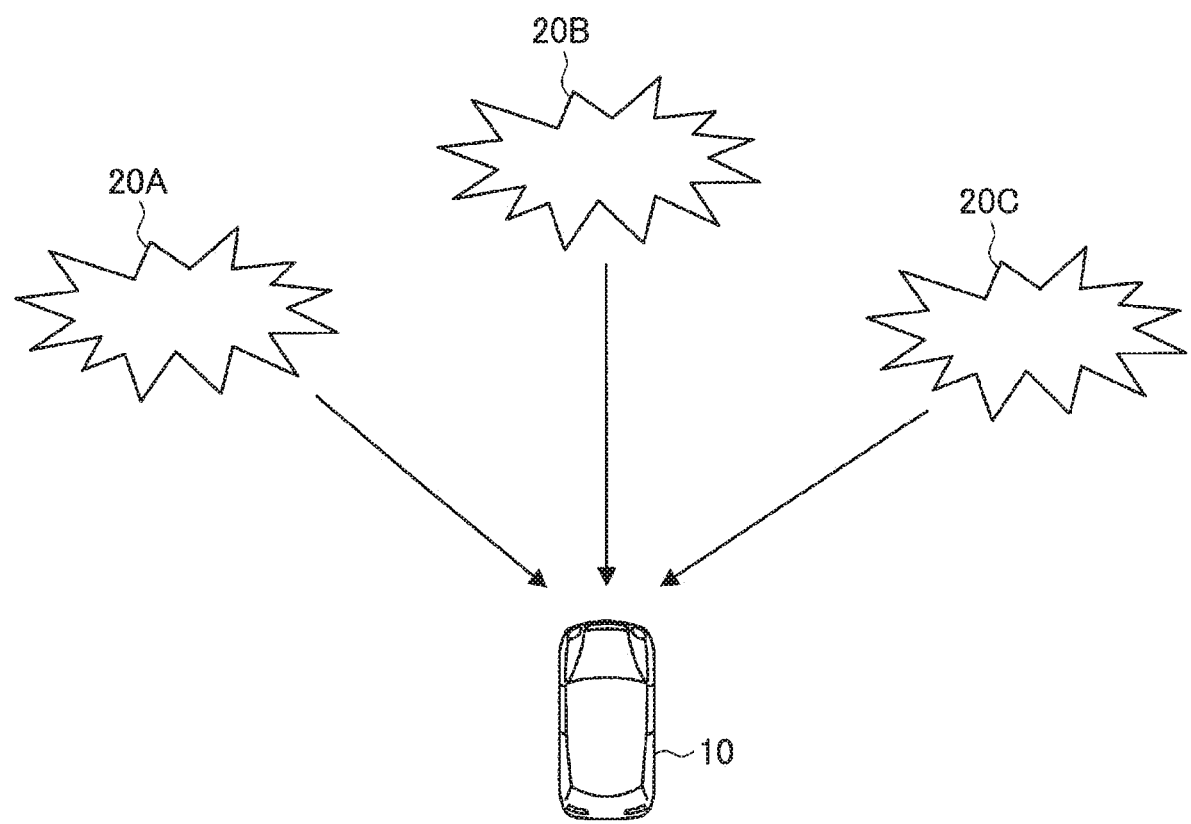
FIG. 8 is a diagram for describing an example of external sound signal separation/selection processing according to the present embodiment.

FIG. 8 is a diagram for describing an example of the external sound signal separation/selection processing according to the present embodiment. As illustrated in FIG. 8, sound sources 20A, 20B, and 20C exist around the moving object 10.

There are the following first to third methods, for example, as the sound source separation technology using two or more microphones.

The first method is a method of extracting a specific sound on the basis of directionality. According to the first method, for example, only the sound source 20A can be extracted. The first method is, for example, delayed beam forming (delay and sum beamforming (DS)).

The second method is a method of removing a specific sound on the basis of directionality. According to the second method, for example, only the sound source 20A can be removed, and the sound sources 20B and 20C can be extracted. The second method is, for example, blind area controlled beamforming (null beamforming (NBF)).

The third method is a method of separating a sound to be statistically independent from an obtained signal although sound source characteristics are unknown. According to the third method, the sound sources 20A, 20B, and 20C can be individually extracted. The third method is, for example, independent component analysis (ICA).

There is the following fourth method, for example, as the sound source separation technology using one, or two or more microphones.

The fourth method is a method of extracting each sound source on the basis of spectral characteristics of the sound source. According to the fourth method, the sound sources 20A, 20B, and 20C can be individually extracted. The fourth method is, for example, non-negative matrix factorization (NMF).

In the above, examples of the beamforming technology and the sound source separation technologies have been described.

For example, the external sound signal separation/selection unit 173A calculates, with regard to the known sound source, the direction in which the known sound source to be acquired exists, using the position information and the map information of the moving object 10. Furthermore, the external sound signal separation/selection unit 173B estimates, with regard to the unknown sound source, the direction in which the unknown sound source exists on the basis of a phase difference of the input signal. Next, the external sound signal separation/selection unit 173 calculates a coefficient of the delayed beamforming in order to acquire the sound in the direction acquired by the calculation. Then, the external sound signal separation/selection unit 173 multiplies the microphone input by the coefficient of the delayed beamforming and outputs the audio signal of the known sound source or the unknown sound source to be acquired to the external sound signal correction filter 174.

External Sound Signal Correction Filter

The external sound signal correction filter 174 (174A or 174B) performs processing of correcting the external sound signal. External sound signal correction processing by an external sound signal correction filter will be described with reference to FIG. 9.

Figure 9:
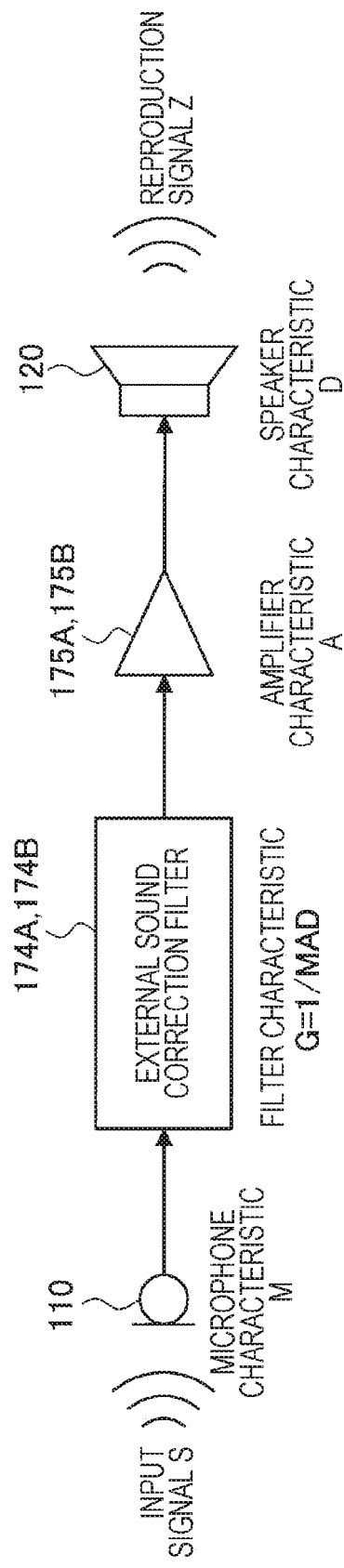
FIG. 9 is a diagram for describing an example of external sound signal correction processing according to the present embodiment.

FIG. 9 is a diagram for describing an example of external sound signal correction processing according to the present embodiment. As illustrated in FIG. 9, an input signal S detected by the microphone 110 passes through the external sound signal correction filter 174, the amplifier 175, and the speaker 120, and is reproduced as a reproduction signal Z. Note that, in FIG. 9, other signal processing illustrated in FIG. 6 is simplified or omitted.

Since the input signal S passes through the above-described path and becomes the reproduction signal Z, the reproduction signal Z becomes a signal having the characteristic of the path. The reproduction signal Z can be expressed by the following expression, where a microphone characteristic is M, a filter characteristic is G, an amplifier characteristic is A, and a speaker characteristic is D.

$$Z = SMGAD \quad (1)$$

The external sound signal correction filter is a filter that corrects the reproduction signal Z to be the same as the input signal S. Therefore, a filter coefficient G is expressed by the following expression, where Z=X is set to the above expression (1).

$$G = 1/MAD \quad (2)$$

As such, it is the external sound signal correction filter that cancels the characteristic MAD. These characteristics are obtained by preliminary measurement, and the filter coefficients are also preset.

Amplifier

The amplifier 175 (175A or 175B) amplifies and outputs the input signal. The amplification amount is controlled by the known sound source control unit 171 or the unknown sound source control unit 176.

Adder 163

As illustrated in FIG. 6, the information processing apparatus 100 adds the signal to which the processing regarding the known sound source has been applied and the signal to which the processing regarding the unknown sound source has been applied, the pieces of processing having been input from the processing group 170, by an adder 163.

Audio Mixer 164

An audio mixer 164 adds a predetermined signal to the signal for taking the external sound, via an adder 165. Examples of the predetermined signal here include an additional sound included in the known sound source information 172, a navigation sound signal output from a car navigation apparatus, an audio signal output from a music reproduction apparatus, and the like.

The information processing apparatus 100 outputs the audio signal for which the above-described series of processing has been performed from the speaker 120.

(2) Third Operation Mode with NC Function

Figure 10:
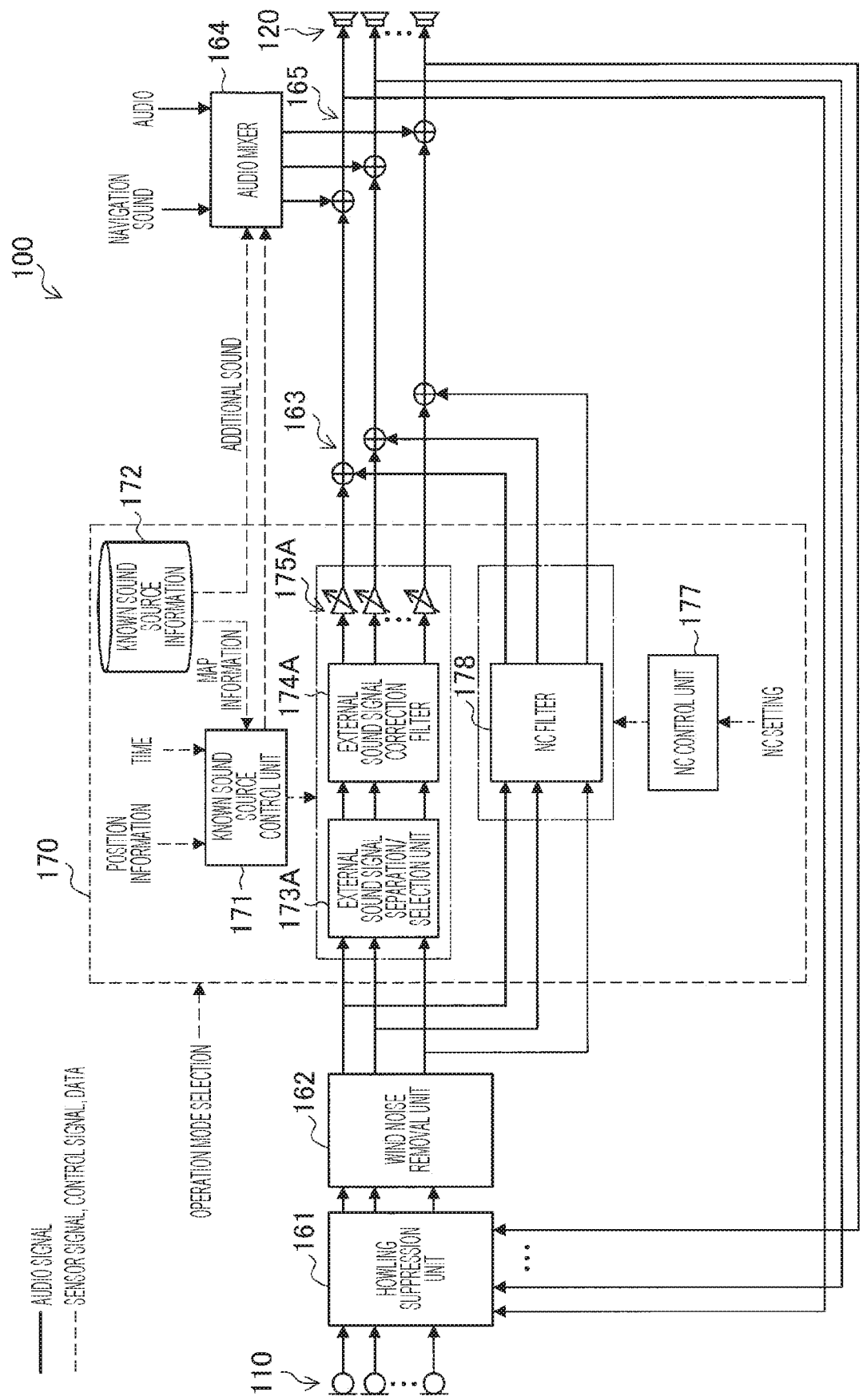
FIG. 10 is a diagram for describing an example of the signal processing by the information processing apparatus according to the present embodiment.

FIG. 10 is a diagram for describing an example of the signal processing by the information processing apparatus 100 according to the present embodiment. FIG. 10 illustrates signal processing in the third operation mode with noise canceling (NC) function. As illustrated in FIG. 10, in the third operation mode with the NC function, the blocks related to the unknown sound source (in other words, the unknown sound source control unit 176, the external sound signal separation/selection unit 173B, the external sound signal correction filter 174B, and the amplifier 175B) are deleted from the signal processing in the above-described fifth operation mode with reference to FIG. 6. Meanwhile, as illustrated in FIG. 10, in the third operation mode with the NC function, an NC control unit 177 and an NC filter 178 as blocks for signal processing for noise canceling are added.

The NC control unit 177 controls signal processing for noise canceling. Specifically, the NC control unit 177 sets a filter coefficient of the NC filter 178 on the basis of preset NC setting. The NC filter 178 applies the filter to the signal input to the processing group 170. The NC control unit 177 can reduce noise by an arbitrary method such as a feedforward (FB) method, a feedforward (FF) method, or an adaptive feedforward (AFF) method.

The adder 163 adds the signal to which the processing regarding the known sound source has been applied and a noise cancellation signal output from the NC filter 178, which are output from the processing group 170.

(3) Fourth Operation Mode with NC Function

Figure 11:
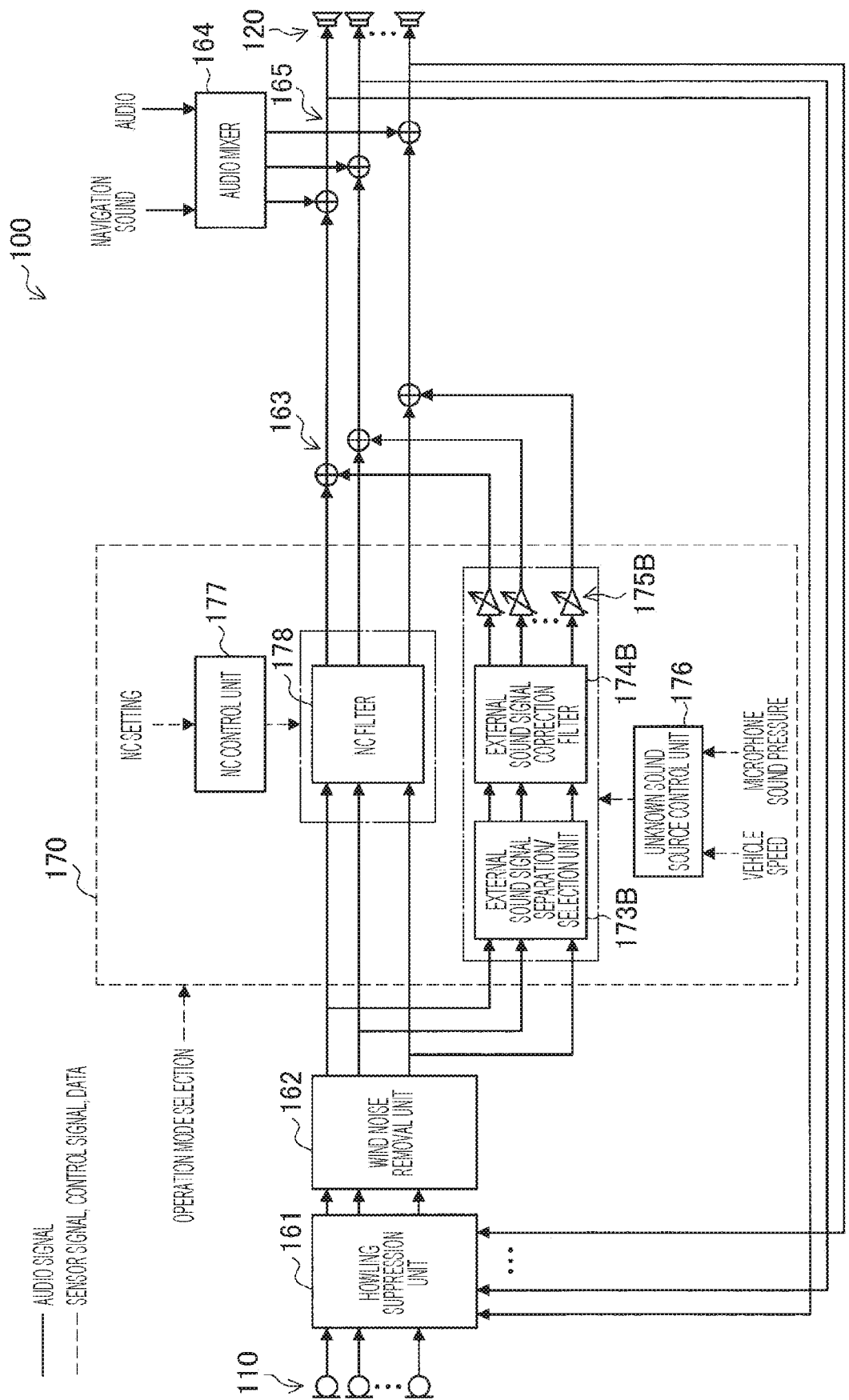
FIG. 11 is a diagram for describing an example of the signal processing by the information processing apparatus according to the present embodiment.

FIG. 11 is a diagram for describing an example of the signal processing by the information processing apparatus 100 according to the present embodiment. FIG. 11 illustrates signal processing in the fourth operation mode with the NC function. As illustrated in FIG. 11, in the fourth operation mode with the NC function, the blocks related to the known sound source (in other words, the known sound source control unit 171, the known sound source information 172, the external sound signal separation/selection unit 173A, the external sound signal correction filter 174A, and the amplifier 175A) are deleted from the signal processing in the above-described fifth operation mode with reference to FIG. 6. Meanwhile, as illustrated in FIG. 11, in the fourth operation mode with the NC function, an NC control unit 177 and an NC filter 178 as blocks for signal processing for noise canceling are added.

The adder 163 adds the signal to which the noise cancellation signal output from the NC filter 178 and the signal to which the processing regarding the unknown sound source has been applied, which have been output from the processing group 170.

(4) Fifth Operation Mode with NC Function

Figure 12:
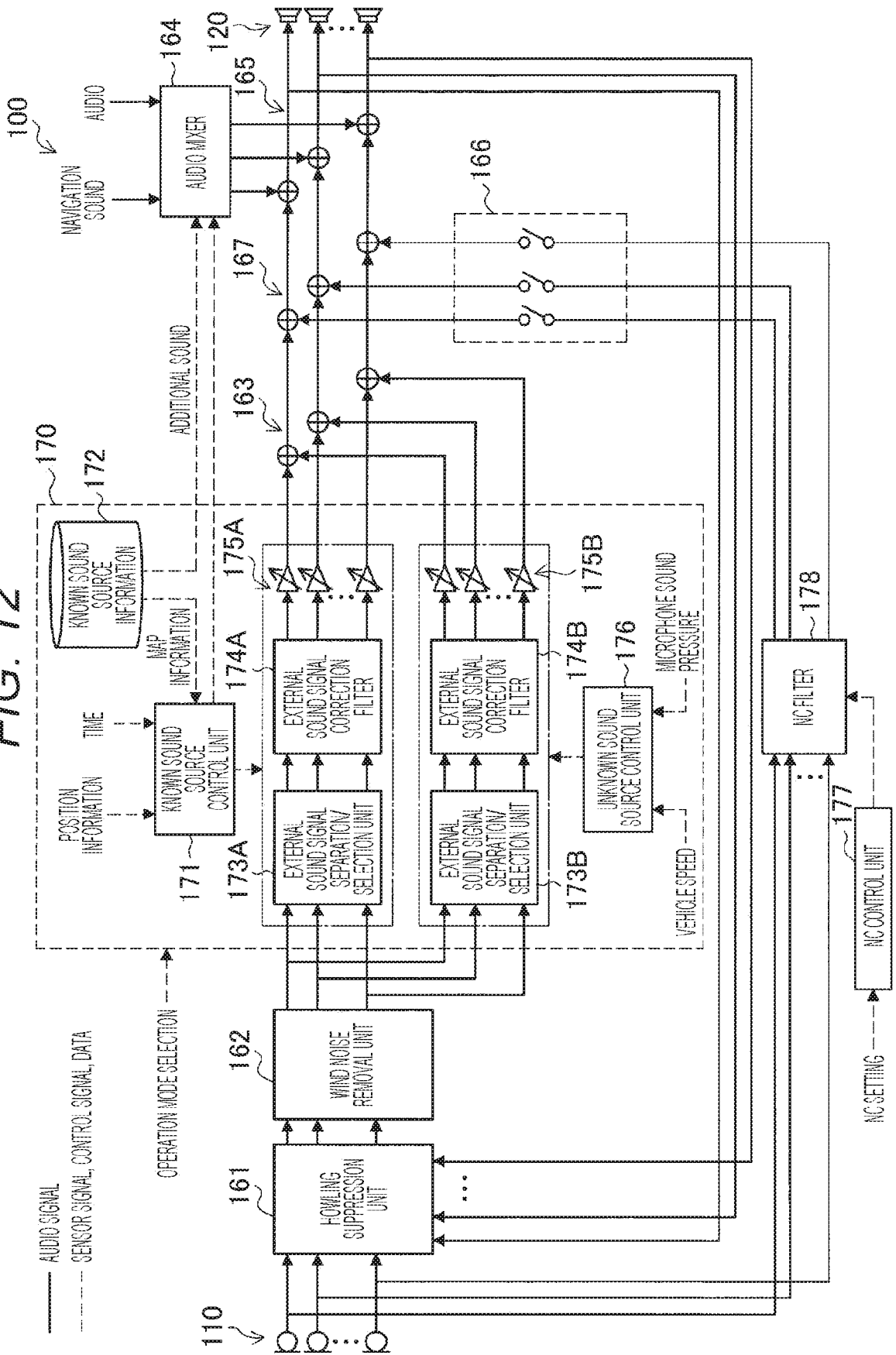
FIG. 12 is a diagram for describing an example of the signal processing by the information processing apparatus according to the present embodiment.

FIG. 12 is a diagram for describing an example of the signal processing by the information processing apparatus 100 according to the present embodiment. FIG. 12 illustrates signal processing in the fifth operation mode with the NC function. As illustrated in FIG. 12, in the fifth operation mode with the NC function, the NC control unit 177 and the NC filter 178 which are blocks for signal processing for noise canceling, and a switch 166 and an adder 167 are added to the signal processing in the fifth operation mode without the NC function described with reference to FIG. 6.

The NC filter 178 illustrated in FIG. 12 applies a filter to the audio signal detected by the microphone 110 according to the control by the NC control unit 177 based on the preset NC setting.

The adder 167 adds the noise cancellation signal to a signal in which the processing regarding the known sound source has been applied and the signal to which the processing regarding the unknown sound has been applied are added, which has been output from the adder 163, and outputs the added signal to the adder 165. The switch 166 can switch whether or not to reproduce the noise cancellation signal output from the NC filter 178.

<<5. Supplement>>

In the above description, a technology of taking the external sound into the space inside the car by the information processing apparatus 100 has been described. On the contrary, the information processing apparatus 100 may emit a sound in the space inside the car (in other words, an internal sound) to the space outside the car. Hereinafter, an operation mode to emit the internal sound into the space outside the car is also referred to as a sixth operation mode.

In the sixth operation mode, the information processing apparatus 100 outputs an audio signal from a sound source (for example, a person such as the driver) existing in the internal space of the moving object 10 toward the outside of the moving object 10.

This enables, for example, a person in the car to talk to a person outside the car. The sixth operation mode can be set on the basis of various criteria. For example, the sixth operation mode can be set according to the presence or absence or the size of the internal sound, a user operation, or the like.

The sixth operation mode can be used in combination with the above-described second operation mode. Thereby, the person in the car can talk with the person outside the car. Therefore, for example, it is possible to receive a refueling service without opening a window at a gas station. Payment can also be made via electronic money without opening a window. Furthermore, since the person in the car can talk with the person outside the car with the window closed, there is a merit on crime prevention.

Hereinafter, processing of releasing the internal sound into the space outside the car will be described with reference to FIG. 13.

Figure 13:
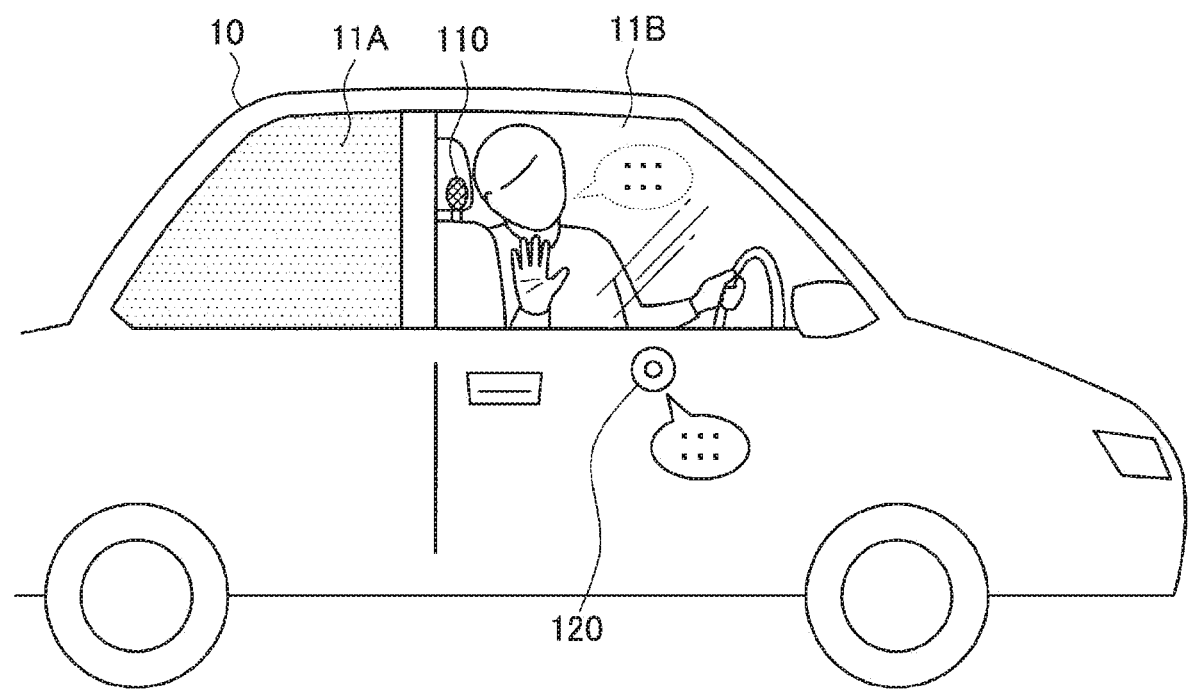
FIG. 13 is a diagram for describing an example of processing of releasing an internal sound into a space outside a car according to the present embodiment.

FIG. 13 is a diagram for describing an example of processing of releasing the internal sound into the space outside the car according to the present embodiment. As illustrated in FIG. 13, there is a person (driver) in the internal space of the moving object 10 and is uttering a sound. The information processing apparatus 100 causes the speaker 120 provided on an outer surface of a door of the moving object 10 to output the audio signal detected by the microphone 110 provided in the internal space of the moving object 10. Here, the information processing apparatus 100 may switch the operation mode to the sixth operation mode in response to a touch operation to a window 11 provided in the moving object 10 and emit the internal sound. For example, the operation mode may be switched to the sixth operation mode when the driver touches the window 11, and the sixth operation mode may be switched to another operation mode when the driver releases the hand from the window 11, as illustrated in FIG. 13. Thereby, the driver can easily start and stop talking with the person outside the car.

The windows 11 (11A and 11B) may be a video see-through display. For example, the window 11 displays a screen in black on the outside of the car while displaying a video of the outside of the car on the inside of the car. With the configuration, the person inside the car can see the state outside the car similarly to the case where the window 11 is made of glass, and the person outside the car can be prevented from peeping. Moreover, the window 11 may be a video see-through display capable of controlling transparency. For example, the window 11 usually has low transparency, and displays the video of the outside of the car on the inside of the car and displays the screen in black on the outside of the car. Meanwhile, as illustrated as a window 11B in FIG. 13, the window 11 has high transparency in a case of operating in the sixth operation mode to enable the person inside the car and the person outside the car to visually recognize each other. Thereby, the person inside the car can smoothly talk with the person outside the car.

<<6. Application>>

The technology according to the present disclosure can be applied to various products. For example, the information processing apparatus 100 may be realized as an apparatus mounted on any type of vehicles such as a car, an electric car, a hybrid electric car, or a motorcycle. Furthermore, at least a part of the configuration elements of the information processing apparatus 100 may be realized by a module (for example, an integrated circuit module configured by one die) for an apparatus mounted on a vehicle.

FIG. 14 is a block diagram illustrating an example of a schematic configuration of a vehicle control system 900 to which the technology of the present disclosure is applicable. The vehicle control system 900 includes an electronic control unit 902, a storage device 904, an input device 906, an external sensor 908, a vehicle state sensor 910, an occupant sensor 912, a communication IF 914, an output device 916, a power generation device 918, a braking device 920, a steering 922, and a lamp actuation device 924.

The electronic control unit 902 functions as an arithmetic processing unit and a control unit, and controls the overall operation in the vehicle control system 900 according to various programs. The electronic control unit 902 may be formed as an electronic control unit (ECU) together with the storage device 904 described below. A plurality of the ECUs (in other words, the electronic control units 902 and the storage devices 904) may be included in the vehicle control system 900. For example, an ECU for controlling each of various sensors or various drive systems may be provided, and an ECU for cooperatively controlling the plurality of ECUs may be further provided. The plurality of ECUs is connected via, for example, an on-board communication network conforming to an arbitrary standard such as a controller area network (CAN), a local interconnect network (LIN), a local area network (LAN), or FlexRay. The electronic control unit 902 can form, for example, the processing unit 150 illustrated in FIG. 2.

The storage device 904 is a device for data storage formed as an example of a storage unit of the vehicle control system 900. The storage device 904 is realized by, for example, a magnetic storage unit device such as an HDD, a semiconductor storage device, an optical storage device, a magneto-optical storage device, or the like. The storage device 904 may include a storage medium, a recording device that records data in the storage medium, a reading device that reads data from the storage medium, a deletion device that deletes data recorded in the storage medium, and the like. The storage device 904 stores programs and various data executed by the electronic control unit 902, and various data acquired from the outside, and the like. The storage device 904 can form, for example, the storage unit 140 illustrated in FIG. 2.

The input device 906 is realized by, for example, devices to which information is input by an occupant (a driver or a passenger), such as a mouse, a keyboard, a touch panel, a button, a microphone, a switch, and a lever. Furthermore, the input device 906 may be, for example, a remote control device using infrared rays or other radio waves or an externally connected device such as a mobile phone or a PDA corresponding to the operation of the vehicle control system 900. Furthermore, the input device 906 may be, for example, a camera, and in this case, the occupant can input information by gesture. Moreover, the input device 906 may include, for example, an input control circuit or the like that generates an input signal on the basis of the information input by the user using the above input means and outputs the input signal to the electronic control unit 902. The occupant can input various data to and gives an instruction on a processing operation to the vehicle control system 900 by operating the input device 906. The input device 906 may form, for example, the sensor unit 110 illustrated in FIG. 2.

The external sensor 908 is realized by a sensor that detects information outside the car. For example, the external sensor 908 may include a sonar device, a radar device, a light detection and ranging or laser imaging detection and ranging (LIDAR) device, a camera, a stereo camera, a time of flight (ToF) camera, an infrared sensor, an environmental sensor, a microphone, or the like. The external sensor 908 may form, for example, the sensor unit 110 illustrated in FIG. 2.

The vehicle state sensor 910 is realized by a sensor that detects information regarding a vehicle state. For example, the vehicle state sensor 910 may include a sensor that detects an operation by the driver, such as an accelerator opening degree, a brake depression pressure, or a steering angle. Furthermore, the vehicle state sensor 910 may include a sensor that detects a state of a power source, such as the number of revolutions or torque of an internal combustion engine or a motor. Furthermore, the vehicle state sensor 910 may include a sensor that detects information regarding a movement of the vehicle, such as a gyro sensor or an acceleration sensor. Furthermore, the vehicle state sensor 910 may include a global navigation satellite system (GNSS) module that receives a GNSS signal from a GNSS satellite (for example, a global positioning system (GPS) signal from a GPS satellite) and measures position information including the latitude, longitude, and altitude of the apparatus. Note that, regarding the position information, the vehicle state sensor 910 may detect the position by transmission and reception with Wi-Fi (registered trademark), a mobile phone, a PHS, a smart phone, or the like, or near field communication, or the like. The vehicle state sensor 910 may form, for example, the sensor unit 110 illustrated in FIG. 2.

The occupant sensor 912 is realized by a sensor that detects information about the occupant. For example, the occupant sensor 912 may include a camera provided in the car, a microphone, and an environmental sensor. Furthermore, the occupant sensor 912 may include a biological sensor that detects biological information of the occupant. The biological sensor is provided on, for example, a seating surface, a steering wheel, or the like, and can detect the biological information of the occupant sitting on a seat or the driver holding the steering wheel. The occupant sensor 912 may form, for example, the sensor unit 110 illustrated in FIG. 2.

Note that the various sensors such as the external sensor 908, the vehicle state sensor 910, and the occupant sensor 912 each output information indicating detection results to the electronic control unit 902. These various sensors may set a sensing range, accuracy, or the like on the basis of control by the electronic control unit 902. Furthermore, these various sensors may include a recognition module that performs recognition processing based on raw data, such as processing of recognizing a traveling position of an owner vehicle on a road on the basis of, for example, a white line position included in a captured image.

The communication IF 914 is a communication interface that mediates communication by the vehicle control system 900 with another device. The communication IF 914 may include, for example, a V2X communication module. Note that V2X communication is a concept including vehicle-to-vehicle communication and vehicle-to-infrastructure communication. In addition, the communication IF 914 may include a communication module for a wireless local area network (LAN), Wi-Fi (registered trademark), 3G, long term evolution (LTE), Bluetooth (registered trademark), near field communication (NFC), or wireless USB (WUSB). The communication IF 914 can transmit and receive signals and the like to and from the Internet or a communication device outside the car, for example, in accordance with a predetermined protocol such as TCP/IP, for example. The communication IF 914 may form, for example, the communication unit 130 illustrated in FIG. 2.

The output device 916 is realized by a device capable of visually or aurally notifying the occupant or the outside of the acquired information. Examples of such a device include display devices such as an instrument panel, a head-up display, a projector, or a lamp, and audio output devices such as a speaker or a headphone. Specifically, the display device visually displays the results obtained by the various types of processing performed by the vehicle control system 900 in various formats such as text, images, tables, and graphs. At this time, a virtual object such as an augmented reality (AR) object may be displayed. Meanwhile, the sound output device converts an audio signal including reproduced sound data, voice data, or the like into an analog signal and aurally outputs the analog signal. The output device 916 may form, for example, the output unit 120 illustrated in FIG. 2.

The power generation device 918 is a device for generating a driving force of a vehicle. The power generation device 918 may be realized by, for example, an internal combustion engine. In that case, the power generation device 918 performs start control, stop control, throttle valve opening control, fuel injection control, exhaust gas recirculation (EGR) control, or the like on the basis of the control command from the electronic control unit 902. Furthermore, the power generation device 918 may be realized by, for example, a motor, an inverter, and a battery. In that case, the power generation device 918 can perform a motor operation (so-called power running) that supplies electric power from a battery to a motor via an inverter to output positive torque, and a regeneration operation to generate electric power by causing the motor to absorb the torque and charge the battery through the inverter, on the basis of a control command from the electronic control unit 902.

The braking device 920 is a device for applying a braking force to the vehicle or for decelerating or stopping the vehicle. The braking device 920 may include, for example, a brake installed on each wheel, a brake pipe for transmitting the depression pressure of a brake pedal to the brake, an electric circuit, or the like. Furthermore, the braking device 920 may also include a control unit for actuating a sliding or anti-slip mechanism by brake control such as an antilock brake system (ABS) or electronic stability control (ESC).

The steering 922 is a device for controlling a traveling direction (steering angle) of the vehicle. The steering 922 may include, for example, a steering wheel, a steering shaft, a steering gear, a tie rod, and the like. Furthermore, the steering 922 may also include power steering for assisting driver's steering. Moreover, the steering 922 may include a power source such as a motor for realizing automatic steering.

The lamp actuation device 924 is a device for actuating various lamps such as a headlight, a blinker, a side lamp, a fog light, and a stop lamp. The lamp actuation device 924 controls, for example, the blinking, the amount of light, the direction of irradiation, or the like, of the lamp.

Note that the power generation device 918, the braking device 920, the steering 922, and the lamp actuation device 924 may operate on the basis of a manual operation by the driver, or may operate on the basis of an automatic operation by the electronic control unit 902.

In the above, an example of the hardware configuration that can realize the functions of the information processing apparatus 100 according to the present embodiment has been described. Each of the configuration elements described above may be realized using a general-purpose member, or may be realized by hardware specialized for the function of each configuration element. Therefore, the hardware configuration to be used can be changed as appropriate according to the technical level of the time of carrying out the present embodiment.

Note that a computer program for realizing the functions of the information processing apparatus 100 according to the above-described present embodiment can be prepared and mounted on an ECU or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium.

<<7. Conclusion>>

Hereinabove, an embodiment of the present disclosure has been described in detail with reference to FIGS. 1 to 14. As described above, the information processing apparatus 100 according to the present embodiment acquires an audio signal from a sound source existing outside a moving object, generates an audio signal from a target sound source located at a distance on the basis of the acquired audio signal, the distance being a distance from the moving object according to a speed of the moving object, among the sound sources, and outputs the audio signal toward an internal space of the moving object. Thereby, the external sound can be taken into the internal space of the moving object. Furthermore, an external sound from an appropriate sound source according to a speed of the moving object can be selectively taken into the internal space of the moving object. Specifically, in terms of a car, a sound environment that provides a realistic feeling as if there were no car wall can be realized in the space inside the car. Furthermore, a person staying in the space inside the car can listen to the external sound from the appropriately selected sound source. Therefore, it is effective for the driving assistance applications such as accident prevention, for example, and also effective for entertainment applications such as listening to a sound effect on a vehicle in an amusement park.

The present technology can be applied in various ways. Examples will be described below.

For example, the present technology can be applied to a tourist bus traveling in a city. In the tourist bus, sounds from the known sound source such as a bell of a clock tower in a tourist attraction or a sound effect of an attraction or from the unknown sound source such as a sound of beach wave seen through a car window or a train sound are taken into the space inside the car, whereby the realistic feeling can be enhanced. Furthermore, in a case where automatic driving technology advances and a bus tour guide and the driver stop getting on the bus, the external sound can be automatically taken in.

For example, the present technology can be applied to a non-convertible. In that case, an external sound or an engine sound as if the occupant were driving a convertible can be provided while taking advantage of the non-convertible that air conditioning temperature is stable and dust and insects cannot enter.

For example, the present technology can be applied to a vehicle in an amusement park. Taking the external sound into the inside of the vehicle with a transparent exterior wall can provide, for example, a simulated warping experience or a safe and realistic traveling experience in areas where dangerous wildlife lives.

The favorable embodiments of the present disclosure have been described in detail with reference to the accompanying drawings, but the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the processing described with reference to the flowcharts and sequence diagrams in the present specification do not necessarily need to be executed in the illustrated order. Some processing steps may be executed in parallel. Furthermore, additional processing steps may be employed and some processing steps may be omitted.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the following configurations also belong to the technical scope of the present disclosure.

(1)

An information processing apparatus including:

an acquisition unit configured to acquire an audio signal from a sound source existing outside a moving object;

a generation unit configured to generate an audio signal from a target sound source at a distance from the moving object, the distance being a distance according to a speed of the moving object, of the sound sources, on the basis of the audio signal acquired by the acquisition unit; and an output control unit configured to output the audio signal generated by the generation unit toward an internal space of the moving object.

(2)

The information processing apparatus according to (1), further including:

a setting unit configured to set an operation mode from an operation mode group including a first operation mode in which the output toward the internal space is not performed and a second operation mode in which the output toward the internal space is performed.

(3)

The information processing apparatus according to (2), in which the second operation mode includes a third operation mode using a known sound source as the target sound source and a fourth operation mode using an unknown sound source as the target sound source.

(4)

The information processing apparatus according to (2) or (3), in which the second operation mode includes a fifth operation mode using a known sound source and an unknown sound source as the target sound sources.

(5)

The information processing apparatus according to (3) or (4), in which the setting unit sets the operation mode on the basis of map information indicating a position of the known sound source and position information of the moving object.

(6)

The information processing apparatus according to (5), in which the map information includes information indicating a time zone in which the known sound source emits a sound, and the setting unit sets the operation mode on the further basis of a current time.

(7)

The information processing apparatus according to any one of (3) to (6), in which the acquisition unit acquires an audio signal regarding the known sound source and stored in advance.

(8)

The information processing apparatus according to any one of (2) to (7), in which the setting unit sets the operation mode on the basis of information from an external device.

(9)

The information processing apparatus according to any one of (1) to (8), in which the generation unit selects the sound source farther from the moving object as the speed of the moving object is higher as the target sound source, and selects the sound source closer to the moving object as the speed of the moving object is lower as the target sound source.

(10)

The information processing apparatus according to (9), in which the generation unit determines the distance between the moving object and the sound source on the basis of time-series change in an azimuth of the sound source with reference to the moving object.

(11)

The information processing apparatus according to (9) or (10), in which the generation unit determines the distance between the moving object and the sound source on the basis of time-series change in a sound pressure from the sound source.

(12)

The information processing apparatus according to any one of (9) to (11), in which the generation unit determines the distance between the moving object and the sound source on the basis of an absolute value of a sound pressure from the sound source.

(13)

The information processing apparatus according to any one of (1) to (12), in which the generation unit selects whether or not to set the sound source as the target sound source according to a type of the sound source.

(14)
The information processing apparatus according to any one of (1) to (13), in which the generation unit selects whether or not to set the sound source as the target sound source according to whether or not a target of a sound from the sound source is the moving object.

(15)
The information processing apparatus according to any one of (1) to (14), in which the output control unit causes an audio signal from a sound source existing in the internal space to be output toward the outside of the moving object in response to a touch operation to a window provided in the moving object.

(16)
The information processing apparatus according to (15), in which the window is a video see-through display capable of controlling transparency.

(17)
The information processing apparatus according to any one of (1) to (16), in which the internal space is a space for a person to stay in the moving object.

(18)
The information processing apparatus according to any one of (1) to (17), in which the moving object is a car.

(19)
An information processing method including:
acquiring an audio signal from a sound source existing outside a moving object;
generating an audio signal from a target sound source at a distance from the moving object, the distance being a distance according to a speed of the moving object, of the sound sources, on the basis of the acquired audio signal; and
outputting, by an output device, the generated audio signal toward an internal space of the moving object.

(20)
A recording medium having a program recorded, the program for causing a computer to function as:
an acquisition unit configured to acquire an audio signal from a sound source existing outside a moving object;
a generation unit configured to generate an audio signal from a target sound source at a distance from the moving object, the distance being a distance according to a speed of the moving object, of the sound sources, on the basis of the audio signal acquired by the acquisition unit; and
an output control unit configured to output the audio signal generated by the generation unit toward an internal space of the moving object.

REFERENCE SIGNS LIST

10 Moving object
20 Sound source
100 Information processing apparatus
110 Sensor unit or microphone
120 Output unit or speaker
130 Communication unit
140 Storage unit
150 Processing unit
151 Acquisition unit
153 Setting unit
155 Generation unit
157 Output control unit

The invention claimed is:

1. An information processing apparatus, comprising:
an acquisition unit configured to acquire a first audio signal from a first sound source existing outside a moving object;
a setting unit configured to:
set a specific operation mode from an operation mode group including a first operation mode and a second operation mode, wherein
the first operation mode is an operation mode in which an output of the first audio signal is executed towards an internal space of the moving object,
the first operation mode includes a third operation mode,
the third operation mode is an operation mode in which a known sound source that is existing outside the moving object is used as a target sound source, and
the specific operation mode is set based on map information that indicates a position of the known sound source and position information of the moving object;
a generation unit configured to generate a second audio signal from the target sound source, wherein
the second audio signal is generated based on the first audio signal,
the target sound source is at a first distance from the moving object, and
the first distance is calculated based on a speed of the moving object; and
an output control unit configured to output the second audio signal generated by the generation unit towards the internal space of the moving object.

2. The information processing apparatus according to claim 1, wherein the second operation mode is an operation mode in which the output of the first audio signal is not executed towards the internal space of the moving object.

3. The information processing apparatus according to claim 2, wherein the first operation mode further includes a fourth operation mode in which an unknown sound source is used as the target sound source.

4. The information processing apparatus according to claim 1, wherein the first operation mode further includes a fifth operation mode in which each of the known sound source and an unknown sound source are used as the target sound source.

5. The information processing apparatus according to claim 1, wherein
the map information includes information indicating a time zone in which the known sound source emits a sound, and
the setting unit is further configured to set the specific operation mode based on a current time.

6. The information processing apparatus according to claim 1, wherein the acquisition unit is further configured to:
acquire the second audio signal from the known sound source; and
store the acquired second audio signal.

7. The information processing apparatus according to claim 1, wherein the setting unit is further configured to set the specific operation mode based on information from an external device.

8. The information processing apparatus according to claim 1, wherein the generation unit is further configured to:

select the first sound source farther from the moving object as the speed of the moving object is higher than the target sound source, and select the first sound source closer to the moving object as the speed of the moving object is lower than the target sound source.

9. The information processing apparatus according to claim 8, wherein the generation unit is further configured to determine a second distance between the moving object and the first sound source based on time-series change in an azimuth of the first sound source with reference to the moving object.

10. The information processing apparatus according to claim 8, wherein the generation unit is further configured to determine a second distance between the moving object and the first sound source based on time-series change in a sound pressure from the first sound source.

11. The information processing apparatus according to claim 8, wherein the generation unit is further configured to determine a second distance between the moving object and the first sound source based on an absolute value of a sound pressure from the first sound source.

12. The information processing apparatus according to claim 1, wherein the generation unit is further configured to select whether to set the first sound source as the target sound source based on a type of the first sound source.

13. The information processing apparatus according to claim 1, wherein the generation unit is further configured to select whether to set the first sound source as the target sound source based on whether a target of a sound from the first sound source is the moving object.

14. The information processing apparatus according to claim 1, wherein the output control unit is further configured to control output of a third audio signal from a second sound source existing in the internal space towards the outside of the moving object based on a touch operation to a window provided in the moving object.

15. The information processing apparatus according to claim 14, wherein the window is a video see-through display capable of controlling transparency.

16. The information processing apparatus according to claim 1, wherein the internal space is a space for a person to stay in the moving object.

17. The information processing apparatus according to claim 1, wherein the moving object is a car.

18. An information processing method, comprising:
acquiring a first audio signal from a sound source existing outside a moving object;
setting a specific operation mode from an operation mode group including a first operation mode and a second operation mode, wherein
the first operation mode is an operation mode in which an output of the first audio signal is executed towards an internal space of the moving object,
the first operation mode includes a third operation mode,
the third operation mode is an operation mode in which a known sound source that is existing outside the moving object is used as a target sound source, and
the specific operation mode is set based on map information that indicates a position of the known sound source and position information of the moving object;
generating a second audio signal from the target sound source, wherein
the second audio signal is generated based on the first audio signal,
the target sound source is at a specific distance from the moving object, and
the specific distance is calculated based on a speed of the moving object; and
outputting the generated second audio signal towards the internal space of the moving object.

19. A non-transitory computer-readable medium having stored thereon computer-executable instructions that, when executed by a processor, cause the processor to execute operations, the operations comprising:
acquiring a first audio signal from a sound source existing outside a moving object;
setting a specific operation mode from an operation mode group including a first operation mode and a second operation mode, wherein
the first operation mode is an operation mode in which an output of the first audio signal is executed towards an internal space of the moving object,
the first operation mode includes a third operation mode,
the third operation mode is an operation mode in which a known sound source that is existing outside the moving object is used as a target sound source, and
the specific operation mode is set based on map information that indicates a position of the known sound source and position information of the moving object;
generating a second audio signal from the target sound source, wherein
the second audio signal is generated based on the first audio signal,
the target sound source is at a specific distance from the moving object, and
the specific distance is calculated based on a speed of the moving object; and
outputting the generated second audio signal towards the internal space of the moving object.

* * * * *